United States Patent
Terada

(10) Patent No.: US 12,056,850 B2
(45) Date of Patent: Aug. 6, 2024

(54) IMAGE PROCESSING DEVICE, IMAGE PROCESSING SYSTEM, IMAGE PROCESSING METHOD, AND IMAGE PROCESSING PROGRAM

(71) Applicant: FUJIFILM Corporation, Tokyo (JP)

(72) Inventor: Masahiro Terada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 442 days.

(21) Appl. No.: 17/529,232

(22) Filed: Nov. 17, 2021

(65) Prior Publication Data

US 2022/0076396 A1  Mar. 10, 2022

Related U.S. Application Data

(63) Continuation of application No. PCT/JP2020/021430, filed on May 29, 2020.

(30) Foreign Application Priority Data

May 31, 2019  (JP) ................. 2019-103133

(51) Int. Cl.
  *G06T 5/50*  (2006.01)
  *G06F 16/55*  (2019.01)
  (Continued)

(52) U.S. Cl.
  CPC ............. *G06T 5/50* (2013.01); *G06F 16/55* (2019.01); *G06F 18/213* (2023.01)

(58) Field of Classification Search
  CPC ......... G06F 16/55; G06F 18/213; G06T 1/00; G06T 5/50
  See application file for complete search history.

(56) References Cited

U.S. PATENT DOCUMENTS 6,665,098 B1 * 12/2003 Nagarajan .......... H04N 1/00517
  358/474
2008/0199199 A1 * 8/2008 Kato .................... G03G 15/502
  399/81

(Continued)

FOREIGN PATENT DOCUMENTS

JP  2008097141  4/2008
JP  2008210383  9/2008

(Continued)

OTHER PUBLICATIONS

"Office Action of Japan Counterpart Application" with English translation thereof, issued on Dec. 7, 2021, p. 1-p. 4.

(Continued)

*Primary Examiner* — Michael J Vanchy, Jr.
(74) *Attorney, Agent, or Firm* — JCIPRNET

(57) ABSTRACT

An image processing device includes at least one processor configured to acquire target data as an image processing target and a designated parameter designated by a user to receive a request for image processing from the user, extract, from a storage unit in which subjects of processed image data previously subjected to the image processing and applied parameters applied to the processed image data are accumulated in association with each other, the applied parameter applied to the processed image data having a subject similar to the target data, derive a use frequency of the designated parameter among the extracted applied parameters based on parameter values of the extracted applied parameters, and output the use frequency of the designated parameter.

16 Claims, 20 Drawing Sheets

(51) Int. Cl.
  *G06F 18/213* (2023.01)
  *G06K 9/62* (2022.01)

(56) References Cited

U.S. PATENT DOCUMENTS

| | | |
|---|---|---|
| 2014/0037160 A1 | 2/2014 | Matsuzaki et al. |
| 2017/0083784 A1 | 3/2017 | Ozeki |

FOREIGN PATENT DOCUMENTS

| | | |
|---|---|---|
| JP | 2008299365 | 12/2008 |
| JP | 2009296172 | 12/2009 |
| JP | 2012146071 | 8/2012 |
| JP | 2014030556 | 2/2014 |
| JP | 2016001467 | 1/2016 |
| JP | 2017059177 | 3/2017 |

OTHER PUBLICATIONS

"Office Action of Japan Counterpart Application", issued on Feb. 21, 2023, with English translation thereof, p. 1-p. 4.
"International Search Report (Form PCT/ISA/210) of PCT/JP2020/021430," mailed on Aug. 11, 2020, with English translation thereof, pp. 1-10.
"Written Opinion of the International Searching Authority (Form PCT/ISA/237)" of PCT/JP2020/021430, mailed on Aug. 11, 2020, with English translation thereof, pp. 1-12.

\* cited by examiner

FIG. 5

| IMAGE Index | REGION CODE | AGE CLASSIFICATION | SEX | TAG BY SUBJECT RECOGNITION | FILM | BRIGHTNESS | COLOR DENSITY | COLOR TEMPERATURE | ... |
|---|---|---|---|---|---|---|---|---|---|
| 1 | 1 | 2 | 0 | FLOWER, SPRING, CHERRY BLOSSOM, PERSON | Velvia | 1 | 2 | 4500 | ... |
| 2 | 2 | 3 | 1 | FLOWER, SPRING, TULIP, FARM, RIVER | Astia | -1 | 1 | 4000 | ... |
| 3 | 1 | 3 | 1 | FLOWER, WINTER, SNOW, ROAD | Velvia | -2 | 2 | 4000 | ... |
| 4 | 2 | 3 | 1 | PERSON, NIGHT VIEW, CHRISTMAS | Velvia | 0 | 1 | 6300 | ... |
| 5 | 2 | 3 | 0 | PERSON, SCENERY, MT. FUJI, HAT | Provia | 0 | 0 | 5600 | ... |
| 6 | 3 | 2 | 1 | STREET, PEOPLE, CAR | Acros | 2 | 0 | 3600 | ... |
| 7 | 4 | 1 | 0 | PERSON, FOUNTAIN | Acros | 2 | 0 | 4000 | ... |
| 8 | 5 | 3 | 1 | SEA, SUNSET, CLOUD | Provia | 1 | 3 | 5300 | ... |
| 9 | 6 | 2 | 1 | ... | Velvia | 1 | 1 | 3600 | ... |
| 10 | 4 | 1 | 1 | ... | Astia | 0 | -1 | 6300 | ... |
| 11 | 2 | 1 | 0 | ... | Provia | 3 | 0 | 6300 | ... |
| 12 | 4 | 4 | 1 | ... | Provia | 0 | 1 | 5900 | ... |
| 13 | 3 | 1 | 0 | ... | Velvia | -3 | -1 | 5900 | ... |
| 14 | 1 | 2 | 0 | ... | Velvia | 0 | 0 | 4500 | ... |
| ... | ... | ... | ... | ... | ... | ... | ... | ... | ... |
| 78,000,000 | 4 | 4 | 1 | PIZZA, WINE, TABLE | ETERNA | 0 | 1 | 5600 | ... |

USER A

TAG INFORMATION: FLOWER, SPRING,
                 CHERRY BLOSSOM, PERSON
FILM: Velvia
BRIGHTNESS: 1
COLOR DENSITY: 2
COLOR TEMPERATURE: 4500

USER B

TAG INFORMATION: FLOWER, SPRING, TULIP,
FARM, RIVER
FILM: Astia
BRIGHTNESS: -1
COLOR DENSITY: 1
COLOR TEMPERATURE: 4000

USER X

TAG INFORMATION: FLOWER, SPRING, TULIP, SKY
FILM: Velvia
BRIGHTNESS: -5
COLOR DENSITY: -3
COLOR TEMPERATURE: 4500

IMAGE PROCESSING DEVICE, IMAGE PROCESSING SYSTEM, IMAGE PROCESSING METHOD, AND IMAGE PROCESSING PROGRAM

CROSS-REFERENCE TO RELATED APPLICATIONS

This application is a continuation application of International Application No. PCT/JP2020/021430 filed May 29, 2020 the disclosure of which is incorporated herein by reference in its entirety. Further, this application claims priorities from Japanese Patent Application No. 2019-103133 filed May 31, 2019, the disclosure of which is incorporated herein by reference in their entirety.

TECHNICAL FIELD

The present disclosure relates to an image processing device, an image processing system, an image processing method, and an image processing program.

RELATED ART

An image processing device that executes development processing based on an image processing instruction from a user has been suggested (see JP2016-1467A).

SUMMARY

An object of the present disclosure is to provide an image processing device, an image processing system, an image processing method, and an image processing program capable of designating image processing parameters in consideration of image processing parameters used previously.

An image processing device according to a first aspect of the present disclosure comprises at least one processor configured to acquire target data as image data to be a target of image processing and a designated parameter as an image processing parameter designated by a user to receive a request for image processing from the user, extract, from a storage unit in which subjects of processed image data previously subjected to the image processing and applied parameters as image processing parameters applied to the processed image data are accumulated in association with each other, the applied parameters applied to the processed image data having a subject similar to the target data, derive a use frequency of the designated parameter among the extracted applied parameters based on parameter values of the extracted applied parameters, and output the use frequency of the designated parameter.

An image processing device according to a second aspect of the present disclosure comprises at least one processor configured to acquire target data as image data to be a target of image processing and a numerical value representing a use frequency designated by a user to receive a request for image processing from the user, extract, from a storage unit in which subjects of processed image data previously subjected to the image processing and applied parameters as image processing parameters applied to the processed image data are accumulated in association with each other, the applied parameters applied to the processed image data having a subject similar to the target data, derive a frequency distribution of a use frequency of each of parameter values of the extracted applied parameters, and with the numerical value representing the use frequency as a search condition to the extracted applied parameters, search for the applied parameters matching the search condition based on the frequency distribution.

An image processing system according to an aspect of the present disclosure is an image processing system comprising a terminal, and an image processing device. The image processing system includes at least one processor configured to acquire target data as image data to be a target of image processing and a designated parameter as an image processing parameter designated by a user to receive a request for image processing from the user, extract, from a storage unit in which subjects of processed image data previously subjected to the image processing and applied parameters as image processing parameters applied to the processed image data are accumulated in association with each other, the applied parameters applied to the processed image data having a subject similar to the target data, derive a use frequency of the designated parameter among the extracted applied parameters based on parameter values of the extracted applied parameters, and output the use frequency of the designated parameter to the terminal.

An image processing method according to an aspect of the present disclosure comprises a reception step of acquiring target data as image data to be a target of image processing and a designated parameter as an image processing parameter designated by a user to receive a request for image processing from the user, an extraction step of extract, from a storage unit in which subjects of processed image data previously subjected to the image processing and applied parameters as image processing parameters applied to the processed image data are accumulated in association with each other, the applied parameters applied to the processed image data having a subject similar to the target data, a derivation step of deriving a use frequency of the designated parameter among the extracted applied parameters based on parameter values of the extracted applied parameters, and an output step of outputting the use frequency of the designated parameter.

An image processing program according to an aspect of the present disclosure causes a computer to execute a reception step of acquiring target data as image data to be a target of image processing and a designated parameter as an image processing parameter designated by a user to receive a request for image processing from the user, an extraction step of extracting, from a storage unit in which subjects of processed image data previously subjected to the image processing and applied parameters as image processing parameters applied to the processed image data are accumulated in association with each other, the applied parameters applied to the processed image data having a subject similar to the target data, a derivation step of deriving a use frequency of the designated parameter among the extracted applied parameters based on parameter values of the extracted applied parameters, and an output step of outputting the use frequency of the designated parameter.

DETAILED DESCRIPTION

FIG. 5 is a diagram showing an example of a data table of image related information.

DETAILED DESCRIPTION

First Embodiment

Figure 1:
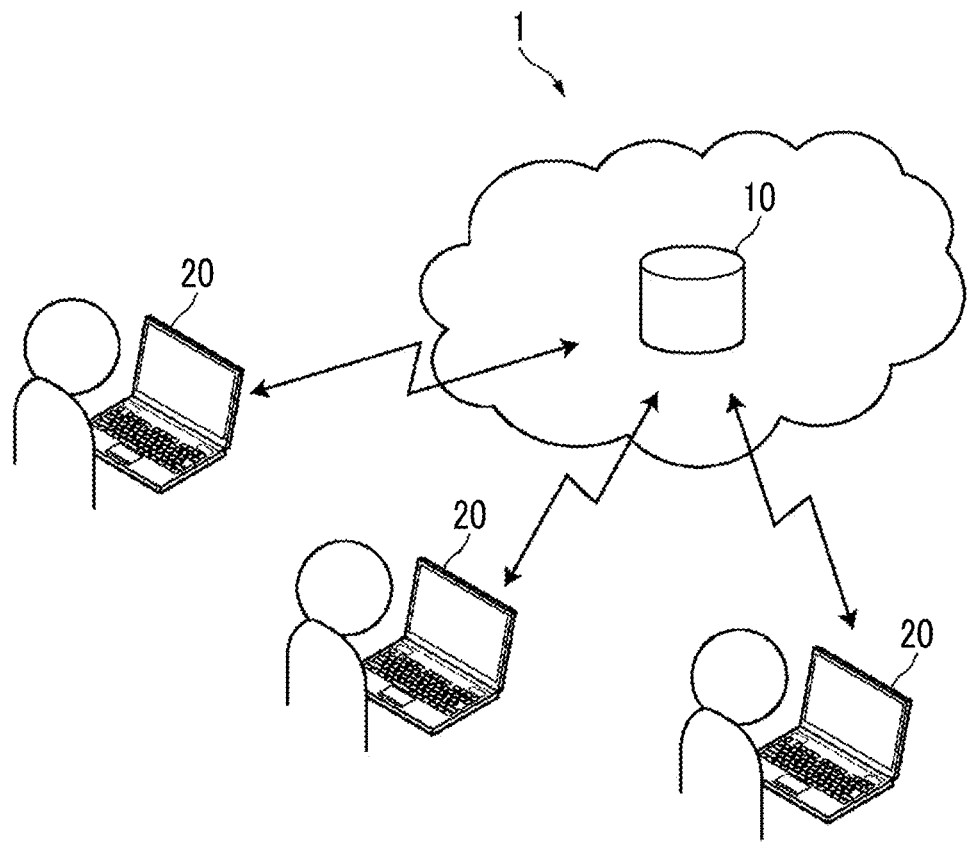
FIG. 1 is a schematic configuration diagram of an image processing system to which an image processing device according to a first embodiment is applied.

Hereinafter, an embodiment of the present disclosure will be described referring to the drawings. FIG. 1 is a schematic configuration diagram of an image processing system to which an image processing device according to a first embodiment of the present disclosure is applied. An image processing system 1 shown in FIG. 1 is a system that can receive a request for development processing from a terminal connected to the image processing system 1 through a network for RAW image data (an example of image data) managed on a cloud and can execute development processing corresponding to the content of the request.

As shown in FIG. 1, the image processing system 1 includes an image processing device 10 and a plurality of terminals 20 that can perform communication with the image processing device 10. Each terminal 20 is a terminal that is used by a user who requests the image processing system 1 for development processing of RAW image data.

The user of the terminal 20 designates the contents of development processing and RAW image data to be a processing target corresponding to user's preference to request development processing.

The image processing device 10 and the terminal 20 are connected through a network, such as the Internet, and since the image processing device 10 looks like being above a cloud as viewed from the terminal 20, the image processing device 10 connected to the terminal 20 through the network is referred to a cloud. In the specification, the image processing device 10 may be hereinafter referred to as the cloud.

Figure 2:
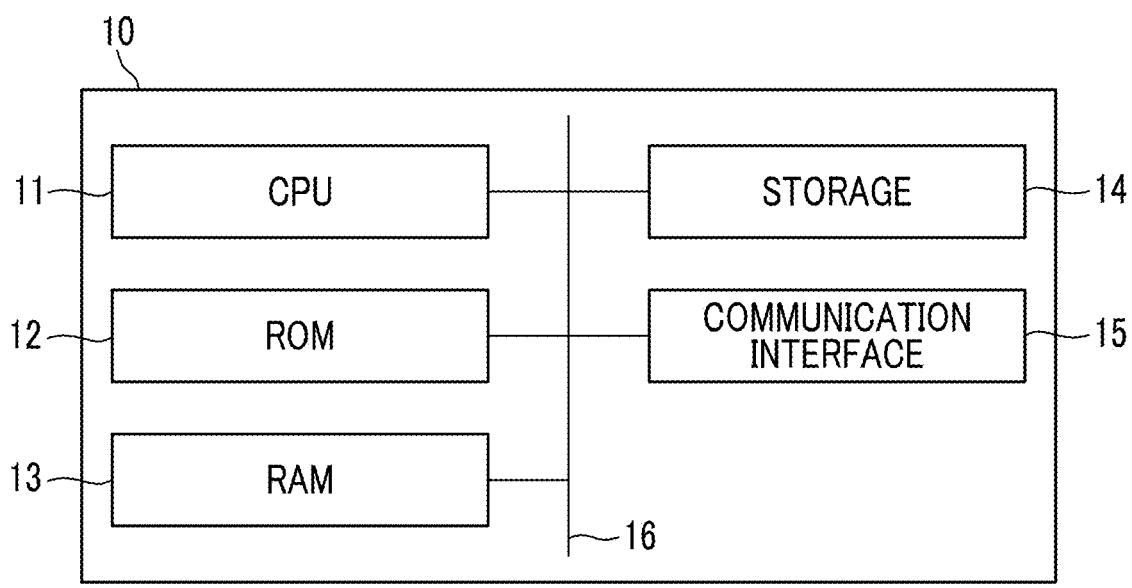
FIG. 2 is a block diagram showing the hardware configuration of the image processing device.

FIG. 2 is a block diagram showing the hardware configuration of the image processing device. As shown in FIG. 2, the image processing device 10 has a central processing unit (CPU: processor) 11, a read only memory (ROM) 12, a random access memory (RAM) 13, a storage 14, and a communication interface 15. The respective configurations are connected to be communicable with one another through a bus 16. The image processing device 10 configures a so-called server.

The CPU 11 is a central arithmetic processing unit and executes various programs or controls respective units. That is, the CPU 11 reads programs from the ROM 12 or the storage 14 and executes the programs with the RAM 13 as a work area. The CPU 11 controls the above-described configurations and executes various kinds of arithmetic processing in association with the programs recorded in the ROM 12 or the storage 14. In the embodiment, an image processing program is stored in the ROM 12 or the storage 14.

The ROM 12 stores various programs and various kinds of data. The RAM 13 temporarily stores a program or data as a work area. The storage 14 is configured with a hard disk drive (HDD) or a solid state drive (SSD) and stores various programs including an operating system and various kinds of data including RAW image data.

The communication interface 15 is an interface that is provided for the image processing device 10 to perform communication with the terminal 20 and other kinds of equipment, and for example, a standard, such as Ethernet (Registered Trademark), Fiber Distributed Data Interface (FDDI), or Wi-Fi (Registered Trademark), is used.

In executing the above-described image processing program, the image processing device 10 realizes various functions using the above-described hardware resources. The functional configuration that is realized by the image processing device 10 will be described.

Figure 3:
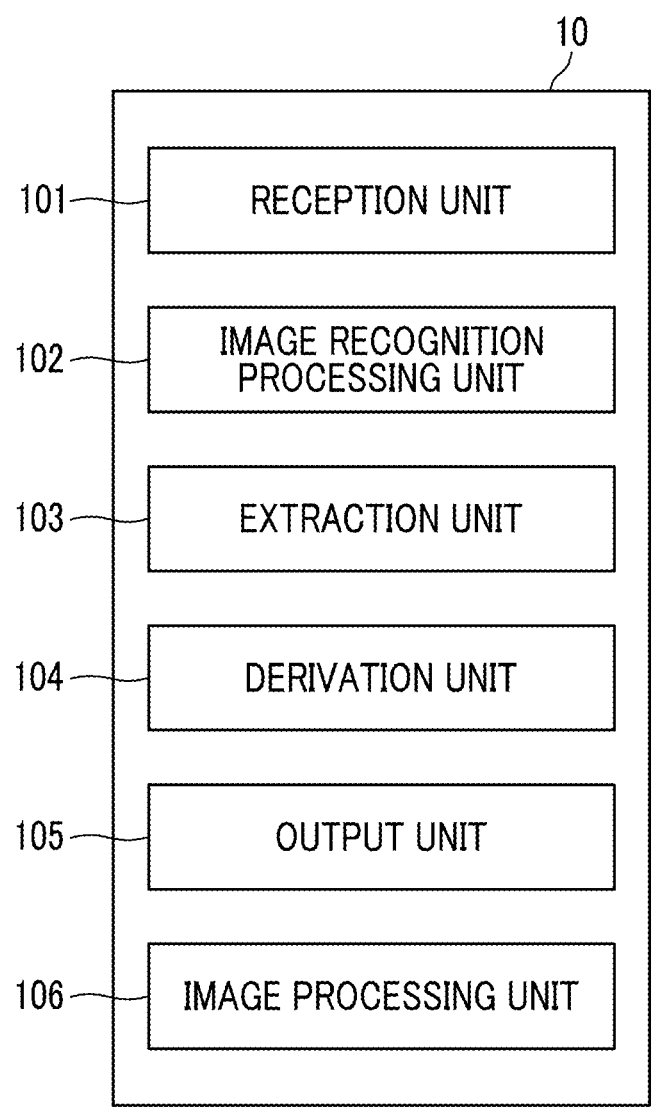
FIG. 3 is a block diagram showing the functional configuration of the image processing device.

FIG. 3 is a block diagram showing the functional configuration of the image processing device. As shown in FIG. 3, the image processing device 10 has, as functional configurations, a reception unit 101, an image recognition processing unit 102, an extraction unit 103, a derivation unit 104, an output unit 105, and an image processing unit 106. The functional configurations are realized by the CPU 11 reading and executing the image processing program stored in the ROM 12 or the storage 14.

The reception unit 101 acquires target data as image data to be a target of image processing and a designated parameter as an image processing parameter designated by the user to receive a request for image processing from the user.

The image recognition processing unit 102 executes image recognition processing to recognize a subject from target data.

From a data table in which subjects of processed image data previously subjected to the image processing and applied parameters as image processing parameters applied to the processed image data are accumulated in association with each other, the extraction unit 103 extracts applied parameters applied to the processed image data having a subject similar to the target data. The data table is stored in the storage 14.

The derivation unit 104 derives a use frequency of the designated parameter among the extracted applied parameters based on parameter values of the extracted applied parameters.

The output unit 105 outputs output data, such as the use frequency of the designated parameter, to the terminal 20.

The image processing unit 106 executes the image processing based on the designated parameter.

Figure 4:
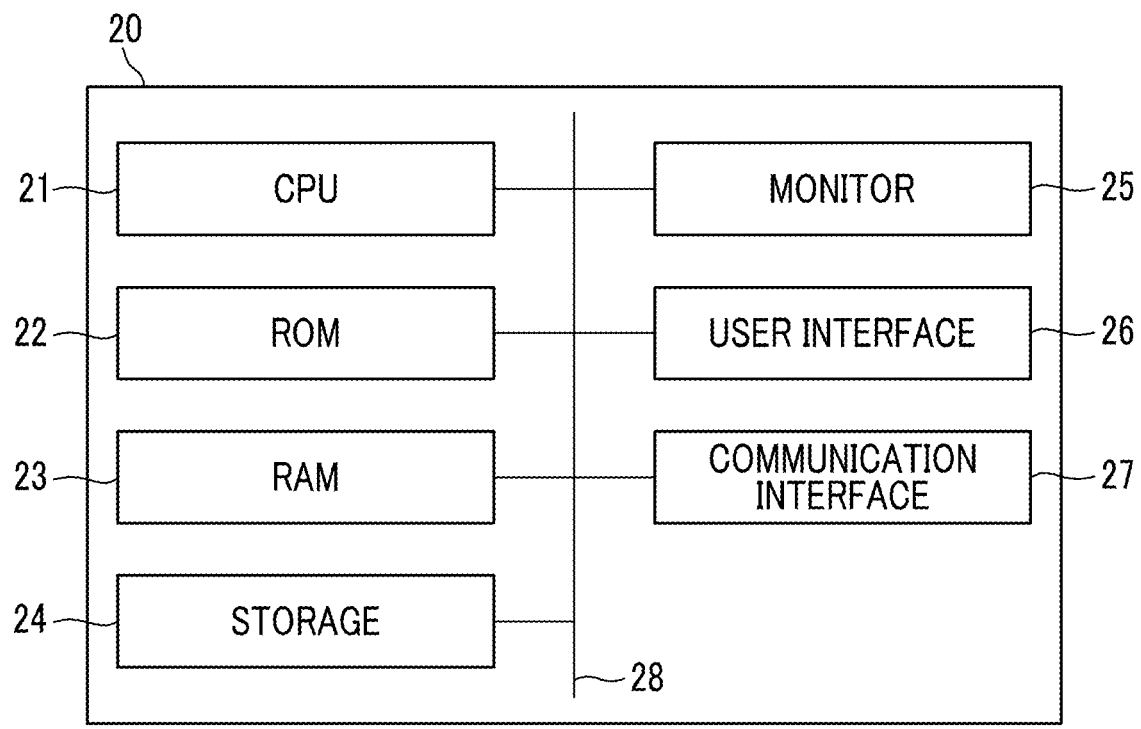
FIG. 4 is a block diagram showing the hardware configuration of a terminal.

FIG. 4 is a block diagram showing the hardware configuration of the terminal 20. As shown in FIG. 4, the terminal 20 has a CPU 21, a ROM 22, a RAM 23, a storage 24, a monitor 25, a user interface 26, and a communication interface 27. The respective configurations are connected to be communicable with one another through a bus 28.

The CPU 21 is a central arithmetic processing unit and executes various programs or control respective units. That is, the CPU 21 reads programs from the ROM 22 or the storage 24 and executes the programs with the RAM 23 as a work area. The CPU 21 controls the above-described configurations and executes various kinds of arithmetic processing in association with the programs recorded in the ROM 22 or the storage 24.

The ROM 22 stores various programs and various kinds of data. The RAM 23 temporarily stores a program or data as a work area. The storage 24 is configured with a hard disk drive (HDD) or a solid state drive (SSD) and stores various programs including an operating system and various kinds of data. Various programs include an image processing application described below.

The monitor 25 is configured using a display device, such as a liquid crystal display or an organic electroluminescence (EL) display.

The user interface 26 is an interface that is used when a user, such as an editor or a viewer, uses the terminal 20. The user interface 26 includes, for example, at least one of a display comprising a touch panel that allows the user to perform a touch operation, a keyboard, or a mouse.

The communication interface 27 is an interface that is provided for the terminal 20 performing communication with the image processing device 10 and other kinds of equipment, and for example, a standard, such as Ethernet (Registered Trademark), FDDI, or Wi-Fi (Registered Trademark), is used.

Figure 6:
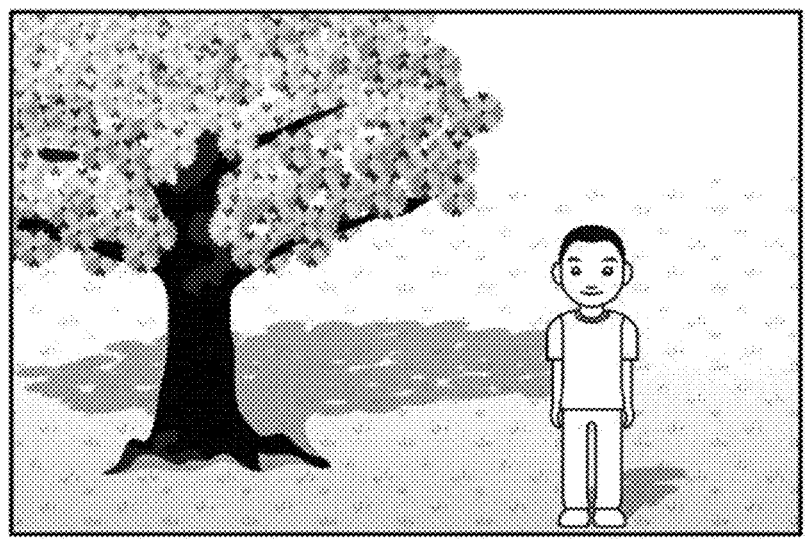
FIG. 6 is a diagram showing an example of an image that is represented by RAW image data previously subjected to development processing.
Figure 7:
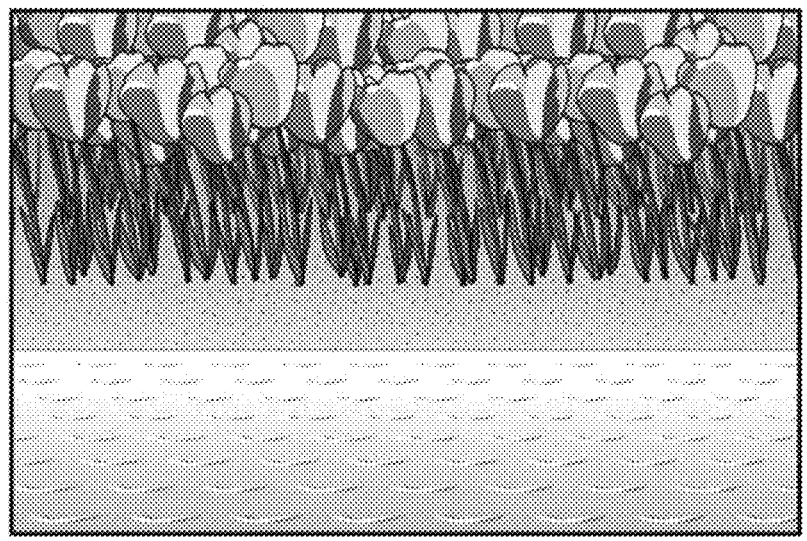
FIG. 7 is a diagram showing an example of an image that is represented by RAW image data previously subjected to development processing.

FIG. 5 is a diagram showing an example of the data table that is stored in the storage 14. FIGS. 6 and 7 are diagrams showing an image that is represented by RAW image data previously subjected to development processing. In FIGS. 5 to 7, all "Provia", "Velvia", "Astia", "Eterna", "Acros" in the drawings are registered trademarks.

The data table records image related information regarding a request for image processing previously received, in this example, a request for development processing to RAW image data. The image related information is image related information regarding RAW image data as an example of processed image data previously subjected to the development processing. The image related information includes identification information of RAW image data, attribute information of a user, subject information indicating a subject shown in the RAW image data, and development processing parameters (an example of image processing parameters) applied at the time of the development processing of the RAW image data.

In the data table, image related information for one request is created in one record for each request for development processing. The image related information for one request includes items "Image Index", "Region Code", "Age Classification", "Sex", "Tag by Subject Recognition", "Film", "Brightness", "Color Density", "Color Temperature", . . . etc.

"Image Index" is a serial number of each received request for development processing and functions as identification information of RAW data for specifying RAW image data to be a target of image processing. The RAW image data is stored in, for example, the storage 14 separately from the data table, and the "Image Index" and the RAW image data are associated with each other. In the data table shown in FIG. 5, the Image Index is up to "78,000,000", and this indicates that there are 78 million pieces of processed RAW image data.

Three items "Region Code", "Age Classification", and "Sex" are an example of the attribute information of the user who requests the development processing. "Region Code" indicates a region where the user resides, and "Age Classification" indicates the age or the date of the user. "Sex" indicates the sex of the user. In regard to the "Region Code", a code corresponding to each region is allocated, for example, in such a manner that 1 is allocated to Japan, 2 is allocated to a North America region, 3 is allocated to a South America region, 4 is allocated to a Europe region, and the like. In regard to "Age Classification", a code corresponding to each age classification is allocated, for example, in such a manner that 0 is allocated to noughties, 1 is allocated to teens, 2 is allocated to twenties, 3 is allocated to thirties, 4 is allocated to forties, 5 is allocated to fifties, and the like. In regard to "Sex", a code corresponding to each sex is allocated, for example, in such a manner that 0 is allocated to male, 1 is allocated to female, and the like.

"Tag by Subject Recognition" is an example of the subject information indicating the subject shown in the RAW image data. In this example, since the subject information has a data format of a tag accompanied with the RAW image data, here, the subject information is referred to as subject tag information. The subject of the RAW image data is extracted by image recognition processing, and the extracted subject is stored as subject tag information. For example, in a record with the Image Index "1", as shown also in FIG. 6, "Flower", "Spring", "Cherry Blossom", and "Person" are set as subject tag information. This indicates that "Flower" is included in the subject shown in RAW image data, and specifically, "Flower" is "Cherry Blossom". The subject tag information "Spring" indicates that "Cherry Blossom" is a spring flower, and thus, the scenery of "Spring" is a subject. In addition, this indicates that "Person" is included as the subject in addition to "Flower".

In a record with the Image Index "2", as shown also in FIG. 7, "Flower", "Spring", "Tulip", and "Farm" are set as subject tag information. This indicates that "Flower", specifically, "Tulip" is included in the subject shown in the RAW image data. This also indicates the subject is the scenery of "Spring", and "Farm" and "River" are included in the subject. Similarly, in a record with the Image Index "4", "Person", "Night View", and "Christmas" are set as subject tag information. This indicates that "Person" is included in the subject shown in the RAW image data. This also indicates that the subject is "Night View", and in addition, is the scenery of "Christmas".

While such subject tag information is basically extracted by the image recognition processing, a person may give subject tag information while viewing an image.

In this example, although an example where person, flower, spring, Christmas, and the like are exemplified as the subject tag information, and such subjects are set with no fine classification has been described, large classifications may be set such that the subjects are classified into, for example, person, plant, season, scenery, and the like.

The items "Film", "Brightness", "Color Density", "Color Temperature", . . . etc, indicate applied parameters as image processing parameters applied to the RAW image data. In this example, since the development processing is executed as the image processing, the image processing parameters may be referred to as development processing parameters. In the item "Film", for example, a product name of a photographic film, such as "Velvia (Registered Trademark)", "Astia (Registered Trademark)", and "Provia (Registered Trademark)", is given. This indicates that a set of parameter values to reproduce a tint peculiar to such a photographic film is designated. For example, in a case where "Velvia (Registered Trademark)" is designated, a set of parameter values to reproduce the tint of "Velvia (Registered Trademark)" is designated. In this example, as shown also in FIG. 6, a set of parameter values of "Velvia (Registered Trademark)" is applied to RAW image data with the Image Index "1". Furthermore, as shown also in FIG. 7, a set of parameter values of "Astia (Registered Trademark)" is applied to RAW image data with the Image Index "2".

The item "Brightness" indicates a parameter value of brightness of an image, and the item "Color Density" indicates a parameter value indicating the density of color. The item "Color Temperature" indicates a parameter value indicating a color temperature. In this example, as shown also in FIG. 6, "1" as the parameter value of "Brightness", "2" as the parameter value of "Color Density", and "4500" as the parameter value of "Color Temperature" are applied to the RAW image data with the Image Index "1". As shown also in FIG. 7, "−1" as the parameter value of "Brightness", "1" as the parameter value of "Color Density", and "4000" as the parameter value of "Color Temperature" are applied to the RAW image data with the Image Index "2". In this example, the parameter values of "Brightness" and "Color Density" are, for example, a value indicating a difference with respect to a reference value. For example, "−1" indicates a parameter value degraded from the reference value by one step.

In this example, subjects of previous processed image data (in this example, RAW image data) subjected to image processing and applied parameters as image processing parameters applied to the processed image data are accumulated in association with each other using the data table shown in FIG. 5.

In this example, the data table shown in FIG. 5 is created by accumulating information of the development processing previously executed in the image processing device 10. While all information registered in the data table is information based on requests for development processing previously received by the image processing device 10, all or a part of information registered in the data table may be of course information based on requests for development processing previously received by other image processing devices.

[Flow of Processing]

Figure 8:
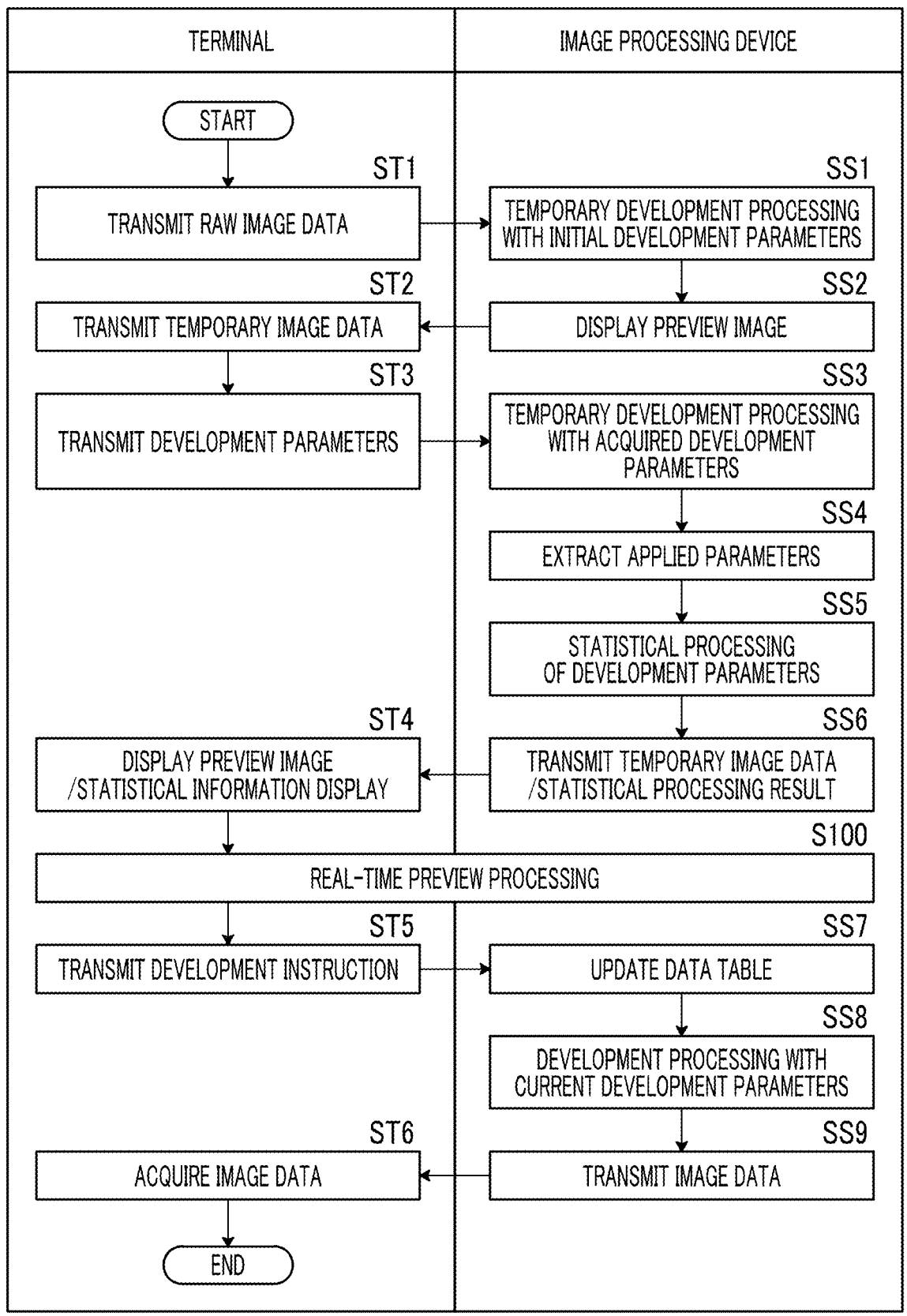
FIG. 8 is a flowchart illustrating a flow of processing at the time of image processing in the image processing system.
Figure 9:
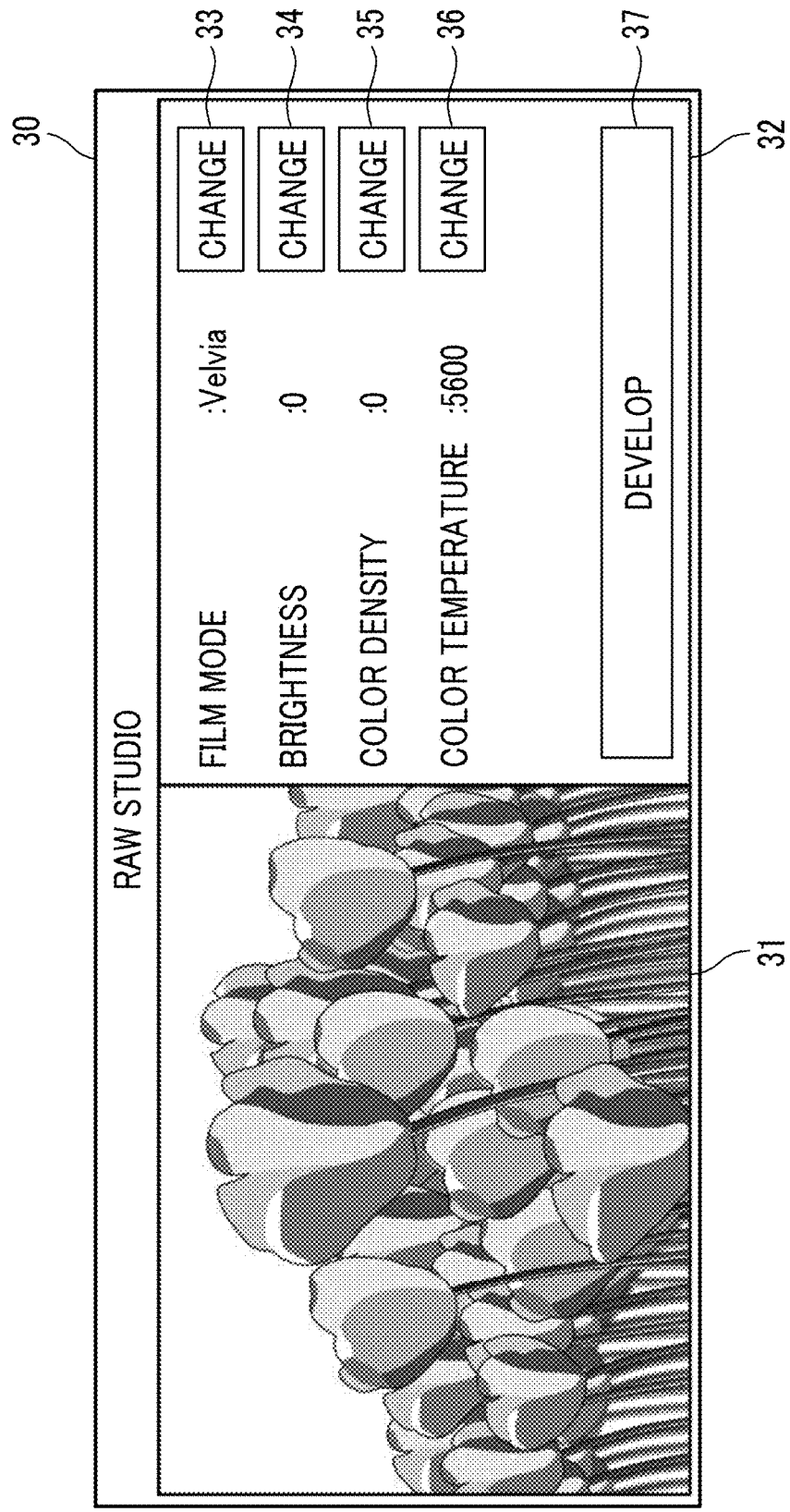
FIG. 9 is a diagram showing an image display example in an image processing application.

Next, a processing procedure in a case where the user requests for development processing of RAW image data as image processing in the image processing system 1 will be described. FIG. 8 is a flowchart illustrating a processing procedure including reception processing and the like in the image processing system 1, and FIG. 9 is a diagram showing a screen display example of the image processing application.

As shown in FIG. 8, in requesting for the development processing, the user designates RAW image data (hereinafter, referred to as RAW image data for development) to be a target of development processing using the image processing application of the terminal 20. In a case where the RAW image data for development is designated in the terminal 20, the CPU 21 transmits the RAW image data for development to the image processing device 10 through the communication interface 27 and the like (Step ST1). Here, the RAW image data for development is an example of "target data" as image data to be a target of image processing.

The CPU 11 in the image processing device 10 acquires the RAW image data for development transmitted from the terminal 20, through the communication interface 15 or the like. With this, the CPU 11 receives a request for image processing from the user. In this way, the CPU 11 functions as the reception unit 101.

In a case where there is no designation of parameters from the user about the acquired RAW image data for development, the CPU 11 executes temporary development processing of acquiring temporary image data for preview with a degraded resolution compared to a real image using initial development processing parameters (Step SS1). The initial development processing parameters are initial values of development processing parameters that are set in the image processing device 10 in a case where there is no designation from the user. Next, the CPU 11 transmits the temporary image data obtained as a result of the temporary development processing to the terminal 20 (Step SS2).

In the terminal 20, in a case where the temporary image data is acquired from the image processing device 10, the CPU 21 displays a preview image based on the acquired temporary image data in an image display region 31 of the image processing application (Step ST2). The user designates the development processing parameters corresponding to user's preference while viewing the displayed preview image. The designation of the development processing parameters is performed through an application screen of the image processing application.

FIG. 9 shows an example of an application screen 30 of the image processing application. In FIG. 9, "Velvia" in the drawing is a registered trademark. As shown in FIG. 9, in the application screen 30, an image display region 31 where the preview image of the RAW image data for development is displayed and a development processing parameter designation region 32 where the development processing parameters to the RAW image data for development are designated are provided.

In the development processing parameter designation region 32, item names and current values of development processing parameters are displayed about four development processing parameters including a film mode (indicating "Film" in FIG. 5), brightness, color density, and a color temperature. In the development processing parameter designation region 32, parameter value change buttons 33 to 36 are provided for the respective items of the development processing parameters. In the development processing parameter designation region 32, a Develop button 37 is provided. In Steps SS1 and ST2 of FIG. 8, in a stage where initial development processing parameters are applied, current values of the items of the development processing parameters are set to initial values defined by the initial development processing parameters.

In the embodiment, an image obtained by imaging tulips will be described as an example of the RAW image data for development. As the parameter values of the initial development processing parameters, "Film Mode: Velvia (Registered Trademark), Brightness: 0, Color Density: 0, and Color Temperature: 5600" are set.

In a case where the user performs an operation to change the parameter values by a click operation of a mouse, or the like for the parameter value change buttons 33 to 36 of the development processing parameter designation region 32, the CPU 21 receives the change content of the parameter value as the designated parameter designated by the user. In this example, since the image processing is development processing, the designated parameter is referred to as a user-designated development processing parameter. In the terminal 20, a method of receiving the user-designated development processing parameter may be a method of receiving only changed portions that are differences from the parameter values of the initial development processing parameters or a method of receiving both the same parameter values as the initial development processing parameters and the changed portions.

Returning to FIG. 8, next, in a case where the user-designated development processing parameter is received, the CPU 21 of the terminal 20 transmits the user-designated development processing parameter to the image processing device 10 (Step ST3). The CPU 11 of the image processing device 10 acquires the user-designated development processing parameter through the communication interface 15. In this way, the CPU 11 functions as the reception unit 101 that acquires the RAW image data for development to be a target of development processing and the user-designated development processing parameter to receive a request for image processing from the user.

In a case where the user-designated development processing parameter is acquired from the terminal 20 in the image processing device 10, the CPU 11 executes temporary development processing using the user-designated development processing parameter (Step SS3). In the temporary development processing of Step SS33 in this example, similarly to the temporary development processing (Step SS1) with respect to the initial development processing parameters, temporary image data for preview with a degraded resolution compared to a real image is generated.

Next, the CPU 11 functions as the extraction unit 103 and extracts applied parameters applied to RAW image data having a subject similar to the RAW image data for development, previously subjected to the image processing from the data table stored in the storage 14 (Step SS4).

In extracting the applied parameters, first, the CPU 11 executes image recognition processing about the contents of the image indicated by the RAW image data for development to recognize a subject. A recognition result is set in the same format as the subject tag information recorded in the data table. Next, the CPU 11 extracts applied parameters applied to RAW image data conforming to the subject tag information of the RAW image data for development from the data table.

Here, "RAW image data conforming to the subject tag information of the RAW image data for development" is not limited to an aspect in which the subject tag information completely conforms and includes an aspect in which only a part of the subject tag information conforms. That is, in addition to a case where the subject information is completely identical, a case where the subject information is similar is also included. A determination criterion of the degree of similarity of a subject is set in advance. For example, in a case where there are a plurality of items in the subject tag information, determination is made that the subject is similar in a case where the number of conforming items is equal to or greater than the number of items set in advance.

Specifically, it is assumed that the CPU 11 sets "Flower, Spring, Tulip, Sky" as the subject tag information based on the image recognition processing on the contents of an image obtained by imaging tulips indicated by the RAW image data for development. As a determination criterion of similarity, the number of conforming items is set to be equal to or greater than three. In this case, the CPU 11 specifies, as similar image data, previous RAW image data having three items or more conforming to the items of the subject tag information of the RAW image data for development from the data table. Similar image information also includes RAW image data in which the subject tag information completely conforms.

In this way, the CPU 11 specifies previous RAW image data having a subject similar to the RAW image data for development as similar image data. The CPU 11 extracts the applied parameters applied to the specified similar image data from the data table. In this way, the CPU 11 functions as the extraction unit 103.

Next, the CPU 11 executes statistical processing of the user-designated development processing parameter based on the extracted applied parameters (Step SS5). The statistical processing includes processing of deriving a frequency distribution of a use frequency of each of the parameter values of the extracted applied parameters and processing of deriving the use frequency of the user-designated development processing parameter among the extracted applied parameters based on the parameter values of the extracted applied parameters. In this way, the CPU 11 functions as the derivation unit 104.

Figure 10:
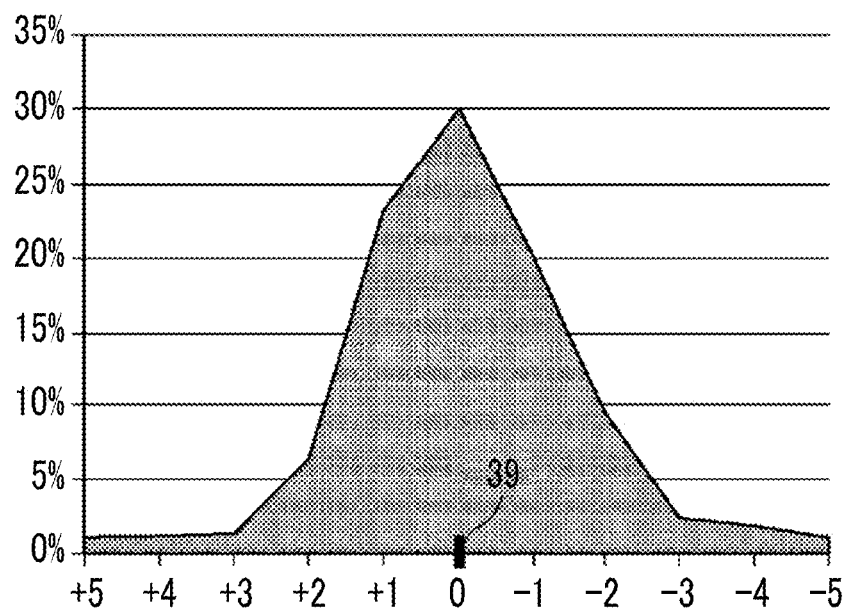
FIG. 10 is a graph showing a statistical processing result.

FIG. 10 is a graph showing a statistical processing result in the embodiment. Specifically, the graph is a graph in which the horizontal axis represents a parameter value and the vertical axis represents a frequency (%), and the graph indicates the frequency distribution of the use frequency of each of the parameter values of the extracted applied parameters. The frequency indicates a ratio of a usage count of each parameter value to a usage count of all parameter values. As described above, the development processing parameters include a plurality of items, such as "Brightness" and "Color Density". The statistical processing is executed for each of the items of the development processing parameters. The graph of FIG. 10 is a graph regarding a parameter of "Brightness". The CPU 11 derives the use frequency of each of the parameter values of the extracted applied parameters. In addition, the CPU 11 derives the frequency distribution of the derived use frequency. The use frequency and the frequency distribution are derived for the items other than "Brightness".

The CPU 11 derives a use frequency of the user-designated development processing parameter (an example of a designated parameter) among the extracted applied parameters based on the frequency distribution. The CPU 11 specifies the applied parameters having the parameter value identical to the parameter value of the user-designated development processing parameter. The CPU 11 derives the use frequency of the specified applied parameter as the use frequency of the user-designated development processing parameter. In this way, the CPU 11 functions as the derivation unit 104.

The derived use frequency of the user-designated development processing parameter is indicated by, for example, a marker 39 shown in FIG. 10. In the example of FIG. 10, the user-designated development processing parameter is "0", and the marker 39 is displayed at the position of "0". In the example of FIG. 10, the position of "0" has a most frequent value (that is, 30%) in the frequency distribution.

Next, the CPU 11 transmits temporary image data to which the user-designated development processing parameter is applied and a statistical processing result to the terminal 20 (Step SS6). The statistical processing result includes the use frequency of the designated parameter designated by the user in the frequency distribution, in addition to the frequency distribution of the applied parameter. That is, the statistical processing result includes data that can reproduce the frequency distribution of each of the applied parameters and the use frequency of the user-designated development processing parameter indicated by the marker 39 as shown in FIG. 10, in the terminal 20. In this way, the CPU 11 functions as the output unit 105 that outputs the use frequency of the designated parameter and the frequency distribution of the use frequency of the applied parameter.

In the terminal 20, in a case where the temporary image data and the statistical processing result are acquired from the image processing device 10, the CPU 21 displays a preview image based on the acquired temporary image data in the image display region 31 of the application screen 30 shown in FIG. 9. In the development processing parameter designation region 32, the parameter value of the user-designated development processing parameter is displayed.

Figure 11:
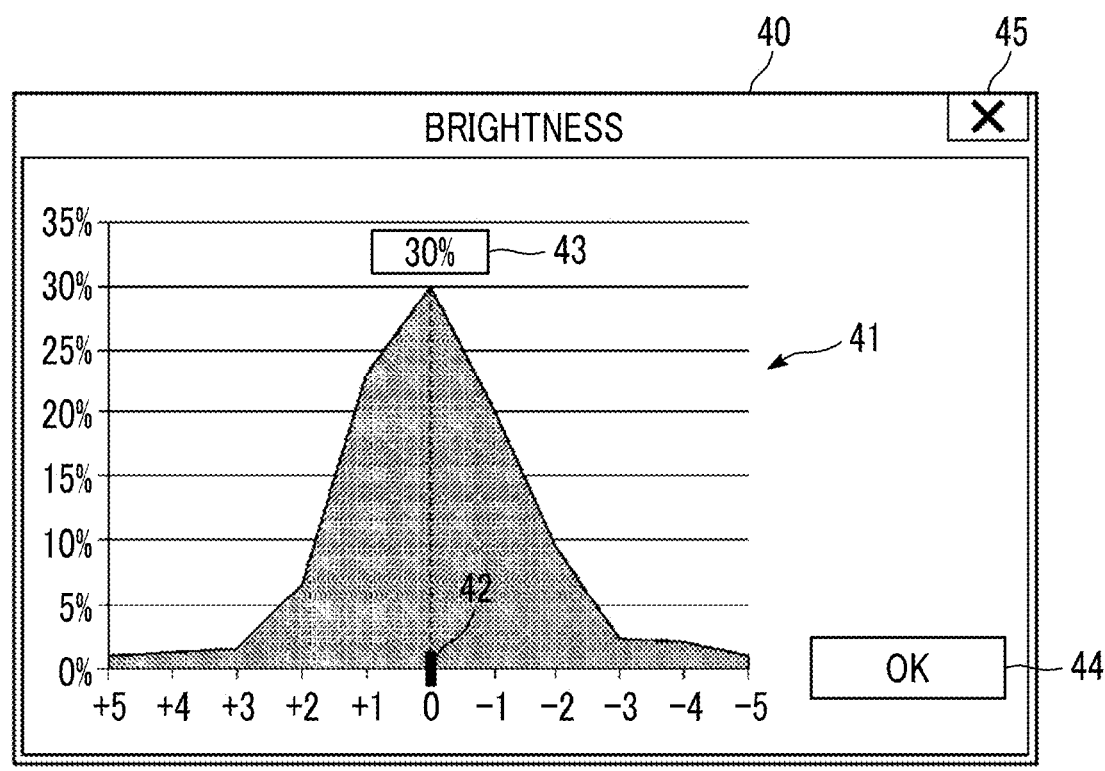
FIG. 11 is a diagram showing a display example of a parameter value change window.

In addition, in the terminal 20, the CPU 21 displays a parameter value change window 40 shown in FIG. 11 based on the acquired statistical processing result. In the parameter value change window 40, a graph 41 showing the frequency distribution of each of the applied parameters shown in FIG. 9 is displayed. In addition to the graph 41, a slider 42 for designating a parameter value, a display frame 43 of a use frequency of the parameter value designated by the slider 42, an OK button 44 for deciding the parameter value, and a cancel button 45 for closing the parameter value change window 40 without changing the parameter value are displayed in the parameter value change window 40.

As described above, the frequency distribution is derived for each image processing parameter, such as "Brightness" and "Color Density". The parameter value change window 40 shown in FIG. 11 is a window corresponding to "Brightness". In this example, only "Brightness" is exemplified, and the parameter value change windows 40 of the parameters other than "Brightness" will be omitted.

In the parameter value change window 40, an initial position of the slider 42 is set to a position corresponding to the use frequency of the user-designated development processing parameter applied to the preview image displayed in the image display region 31. That is, the slider 42 is displayed at a position corresponding to the marker 39 shown in FIG. 10 based on the use frequency of the user-designated development processing parameter included in the statistical processing result.

In this example, the slider 42 is at a position where the parameter value of "Brightness" is "0", and the use frequency of the parameter value "0" is displayed as a numerical value (that is, 30%) in the display frame 43. The use frequency of the parameter value is the most frequent value in the frequency distribution as described above. That is, this indicates the parameter value of the user-designated development processing parameter is a most frequent value among the applied parameters to the RAW image data including the same subject information. That is, this indicates that the user-designated development processing parameter is the same parameter as a parameter used by many people in previous development processing.

Figure 12:
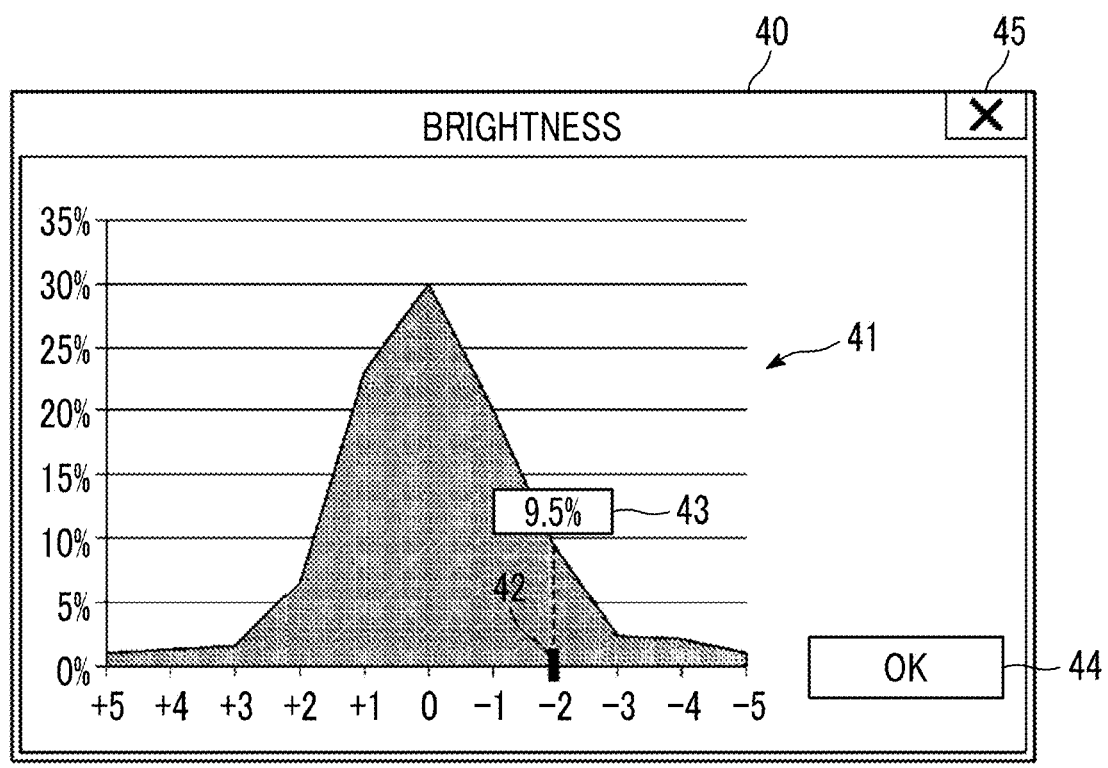
FIG. 12 is a diagram showing a display example of the parameter value change window.

The user can change the parameter value by moving the slider 42 right and left. In a case where the slider 42 is moved, the use frequency of the parameter value corresponding to a moved position is displayed in the display frame 43. For example, as shown in FIG. 12, in a case where the user moves the slider 42 to a position of a parameter value "−2", 9.5% that is a use frequency of the parameter value "−2" is displayed in the display frame 43. Since the graph 41 shows the development processing parameter previously used by other users, the user can designate the development processing parameter by means of the graph 41 while taking into consideration the development processing parameter previously used by other users.

In FIG. 8, after Step ST4, the terminal 20 and the image processing device 10 can execute real-time preview processing (Step S100) to which the changed development processing parameter is applied. The real-time preview processing is processing in which, until the Develop button 37 is finally clicked on the application screen 30, in a case where the parameter value is changed by the movement of the slider 42 of the parameter value change window 40, the preview image displayed in the image display region 31 is updated by the changed parameter value. That is, in a case where the parameter value is changed by the movement of the slider 42 in the terminal 20, the terminal 20 transmits the changed parameter value to the image processing device 10. The image processing device 10 executes development processing on the RAW image data for development based on the changed parameter value to generate temporary image data. Then, a preview image based on the generated temporary image data is transmitted to the terminal 20. In the terminal 20, the preview image of the image display region 31 is updated to the received preview image. With this, the preview image is updated in real time corresponding to a user's operation on the slider 42.

In a case where the OK button 44 is clicked in the parameter value change window 40, the CPU 21 confirms the change of the user-designated development processing parameter with the parameter value where the slider 42 is positioned when the OK button 44 is clicked. Then, after confirmation, the parameter value change window 40 is closed. In a case where the cancel button 45 is clicked, the CPU 21 closes the parameter value change window 40 without changing the parameter value.

With the use of a real-time preview function, the user can select the parameter value while viewing the preview image after the parameter value is changed. The same processing is executed on the items of all the development processing parameters. Finally, in a stage where the development processing parameter that the user satisfies is set, the OK button 44 of the parameter value change window 40 is clicked, and the Develop button 37 of the application screen 30 is clicked. With this, the CPU 21 transmits a development instruction of the development processing parameter with the change confirmed, to the image processing device 10 (Step ST5).

Figure 13:
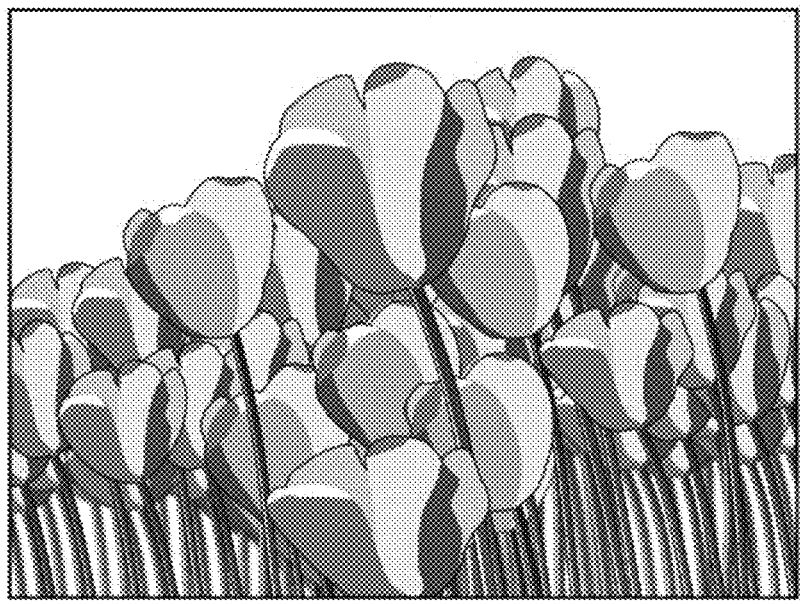
FIG. 13 is a diagram showing an example of an image that is represented by RAW image data for development.

FIG. 13 is an example where the development processing parameter with the change confirmed is applied to the image obtained by imaging tulips displayed in FIG. 9. In FIG. 13, "Velvia" in the drawing is a registered trademark. In the example of FIG. 13, final development processing parameters are "Film Mode: Velvia (Registered Trademark), Brightness: −5, Color Density: −3, Color Temperature: 4500".

In a case where a final development instruction is acquired from the terminal 20 in the image processing device 10, the CPU 11 performs update for adding information regarding the RAW image data for development to the data table (Step SS8). That is, through the update processing of the data table, the development processing parameters used in the latest request for development processing are sequentially accumulated as the applied parameters that are used in a next request for image processing. As described above, the latest development processing parameters are "Film Mode: Velvia (Registered Trademark), Brightness: −5, Color Density: −3, Color Temperature: 4500", and the parameter values are registered in the data table.

In updating the data table, the items other than the development processing parameters are registered as follows. The user attribute information is registered, for example, based on account information of the user acquired from the user when the image processing device 10 is used. The CPU 11 registers, as the subject tag information, "Flower, Spring, Tulip, Sky" that is the subject tag information extracted in Step SS4.

Next, the CPU 11 functions as the image processing unit 106 and executes the development processing using current development processing parameters (Step SS8). Next, the CPU 11 transmits image data obtained as a result of the development processing to the terminal 20 (Step SS9).

In the terminal 20, in a case where image data is acquired from the image processing device 10 (Step ST6), the process ends.

Operations and Effects

As described above, the image processing device 10 of the embodiment acquires the RAW image data for development (an example of target data) to be a target of development processing (an example of image processing) and the user-designated development processing parameter (an example of a designated parameter) designated by the user to receive a request for development processing from the user. Then, the subjects of the RAW image data (an example of processed image data) previously subjected to the development processing and the applied parameters as the development processing parameters (an example of image processing parameters) applied to the processed image data are accumulated in the form of the data table in association with each other in the storage 14 as an example of a storage unit. The image processing device 10 extracts the applied parameters applied to the RAW image data (an example of processed image data) having a subject similar to the RAW image data for development (an example of target data) from the data table, derives the use frequency of the user-designated development processing parameter (an example of a designated parameter) among the extracted applied parameters based on the parameter values of the extracted applied parameters, and outputs the derived use frequency to the terminal 20.

For this reason, the output use frequency can be displayed in the terminal 20. With this, the user can recognize whether the user-designated development processing parameter is generally frequently used or is generally rarely used, for example. That is, the user can recognize the rating of the development processing parameter designated by the user among the development processing parameters used by other users. In addition, the user can designate the development processing parameter generally frequently used to execute development processing in standard style or can designate the development processing parameter generally rarely used to execute development processing in creative style. That is, according to the technique of the present disclosure, it is possible to execute development processing taking into consideration the development processing parameter previously used by other users.

The image processing device 10 of the embodiment derives the frequency distribution of the use frequency of each of the parameter values of the extracted applied parameters and transmits a derivation result to the terminal 20. For this reason, it is possible to present the tendency of the development processing parameters previously used by other users to the user more easily understandably.

The image processing device 10 of the embodiment stores the subjects of the processed image data stored in association with the applied parameters as the tag information representing the subjects. The image processing device 10 of the embodiment comprises the image recognition processing unit that executes the image recognition processing to recognize the subject from the RAW image data for development, whereby there is no need to execute the image recognition processing on the RAW image data each time the RAW image data having a subject similar to the RAW image data for development is extracted, and it is possible to execute efficient processing.

Modification Example in First Embodiment

Figure 14:
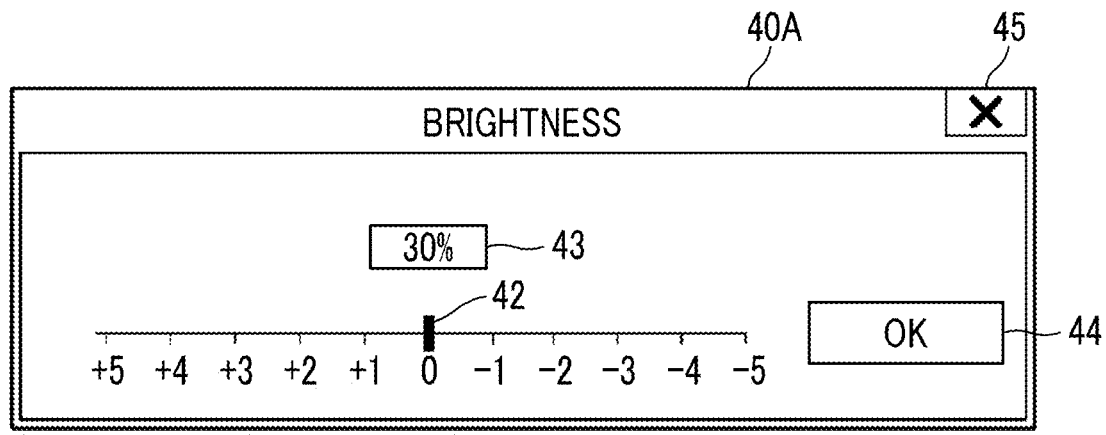
FIG. 14 is a diagram showing a display example of the parameter value change window.

In the embodiment, a display aspect of the parameter value change window is not limited to the aspect shown in FIG. 11, and as shown in FIG. 14, the graph showing the frequency distribution of the applied parameter may be omitted. Even with such an aspect, it is possible to present the use frequency of the user-designated development processing parameter (an example of a designated parameter) using the display frame 43.

Figure 15:
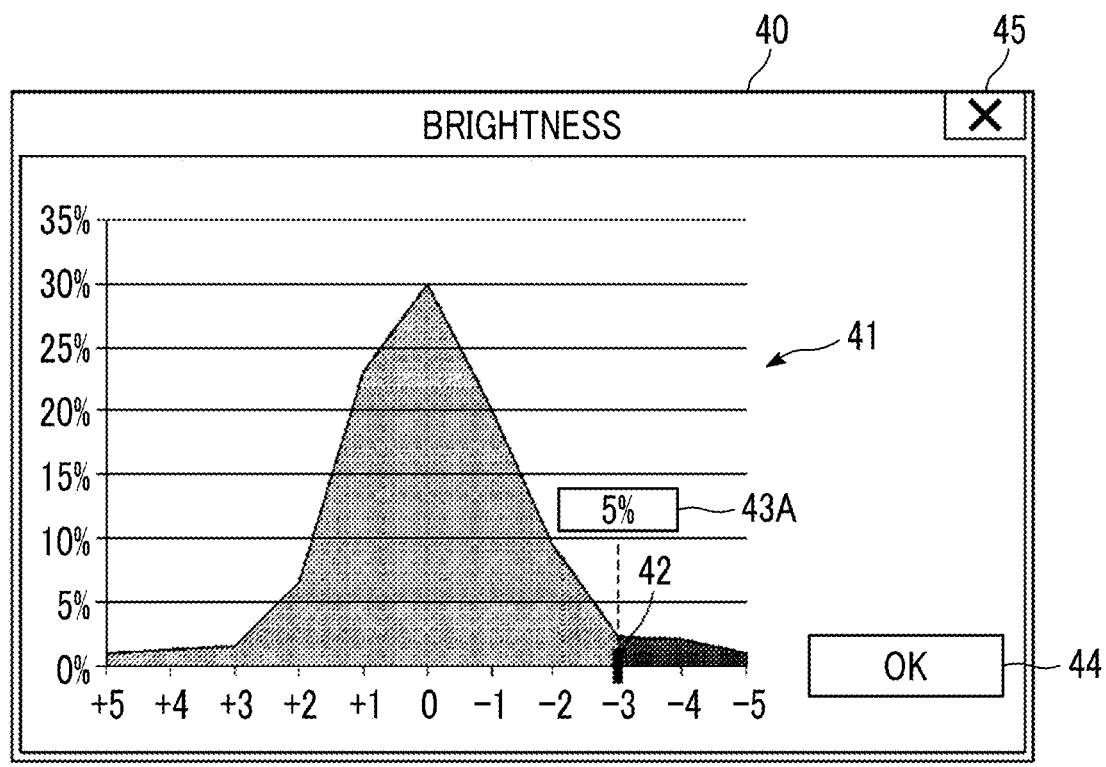
FIG. 15 is a diagram showing a display example of the parameter value change window.

In FIGS. 11 and 12, the use frequency of the parameter value at which the slider 42 is positioned is displayed as the value displayed in the display frame 43. In addition to the display aspect of FIGS. 11 and 12, as shown in FIG. 15, a cumulative frequency of each parameter value present from one end of the frequency distribution to the parameter value at which the slider 42 is positioned may be displayed as the value displayed in the display frame 43. In a case where it is assumed that the frequency distribution has a shape close to a Gaussian distribution having a peak at the center, one end of the frequency distribution indicates a parameter value having extremely high rarity.

In an example shown in FIG. 15, a parameter value at which the slider 42 is positioned is "−3", and there are parameter values "−4" and "−5" on the right side thereof. The cumulative frequency is a cumulative value of the use frequency of each parameter value from the parameter value "−5" at the right end having high rarity of the frequency distribution to the parameter value "−3" at which the slider 42 is positioned. The cumulative frequency can be used as an index indicating rarity. In a case where the cumulative frequency is small, each parameter value included in the cumulative frequency has rarity, and in a case where the designated parameter is included in the cumulative frequency, the designated parameter shows rarity.

For example, in FIG. 15, it is assumed that the use frequency of the parameter value "−3" at which the slider 42 is positioned is "3%". Then, in a case where it is assumed that the use frequency of the parameter value "−4" is "1.5%", and the use frequency of the parameter value "−5" is "0.5%", the cumulative frequency of each parameter value from the right end of the frequency distribution to the parameter value at which the slider 42 is positioned is "5%". Through the display as shown in FIG. 15, the use frequency of the designated parameter cannot be recognized; however, the display indicates that the designated parameter is included in the cumulative frequency "5%", and accordingly, it is possible to recognize how much the designated parameter is rare.

Figure 16:
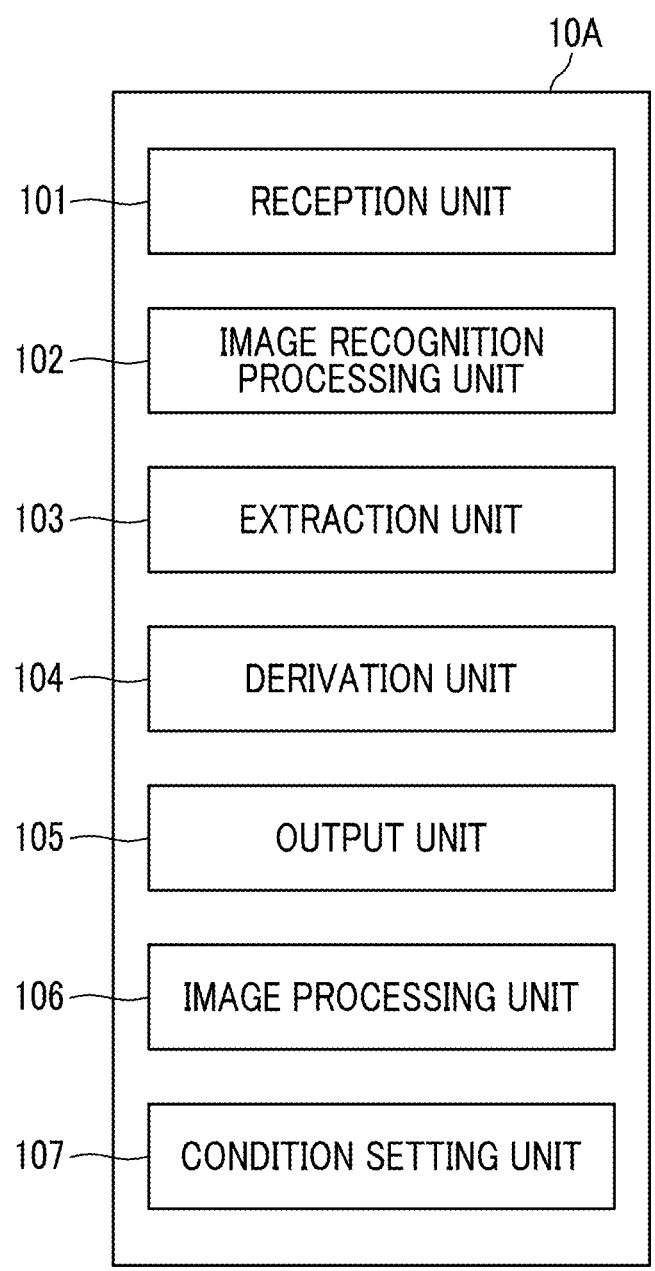
FIG. 16 is a block diagram showing the functional configuration in a modification example of the image processing device according to the first embodiment.

In the above-described example, only the degree of similarity of the subject is used as an extraction condition of the applied parameters by the extraction unit 103. As the extraction condition, other extraction conditions may be used in addition to the degree of similarity of the subject. For example, like an image processing device 10A shown in FIG. 16, an image processing device may further comprise a condition setting unit 107 that, as the extraction condition of the applied parameters by the extraction unit 103, can use the degree of similarity of the subject as a first extraction condition and can set a second extraction condition different from the degree of similarity of the subject in addition to the first extraction condition. In this case, the extraction unit 103 extracts applied parameters under the first extraction condition and the second extraction condition, and the derivation unit 104 derives the use frequency of the designated parameter among the applied parameters based on parameter values of the applied parameters extracted under the first extraction condition and the second extraction condition.

As the second extraction condition, for example, the item of the development processing parameter can be set. For example, a condition that the film mode is set to monochrome is used as the second extraction condition. With such an aspect, for example, it is possible to extract applied parameters applied to RAW image data with the film mode set to monochrome among the RAW image data having the subject similar to the RAW image data for development. In a case where the attribute information of the user is accumulated in the data table together, the user attribute information may be used as the second extraction condition. The user attribute information is used as the second extraction condition, whereby it is possible to extract RAW applied parameters applied to RAW image data that is edited by people who reside in Japan and are fifties or older, among the RAW image data having the subject similar to the RAW image data for development. That is, it is possible to subdivide and acquire the tendency of the development processing parameter used by other users.

The "development processing parameter previously used by other users" obtained by extracting the applied parameters may include the development processing parameter previously used by the user or may be strict "development processing parameter previously used by other users" excluding the development processing parameter previously used by the user as needed.

Second Embodiment

Figure 17:
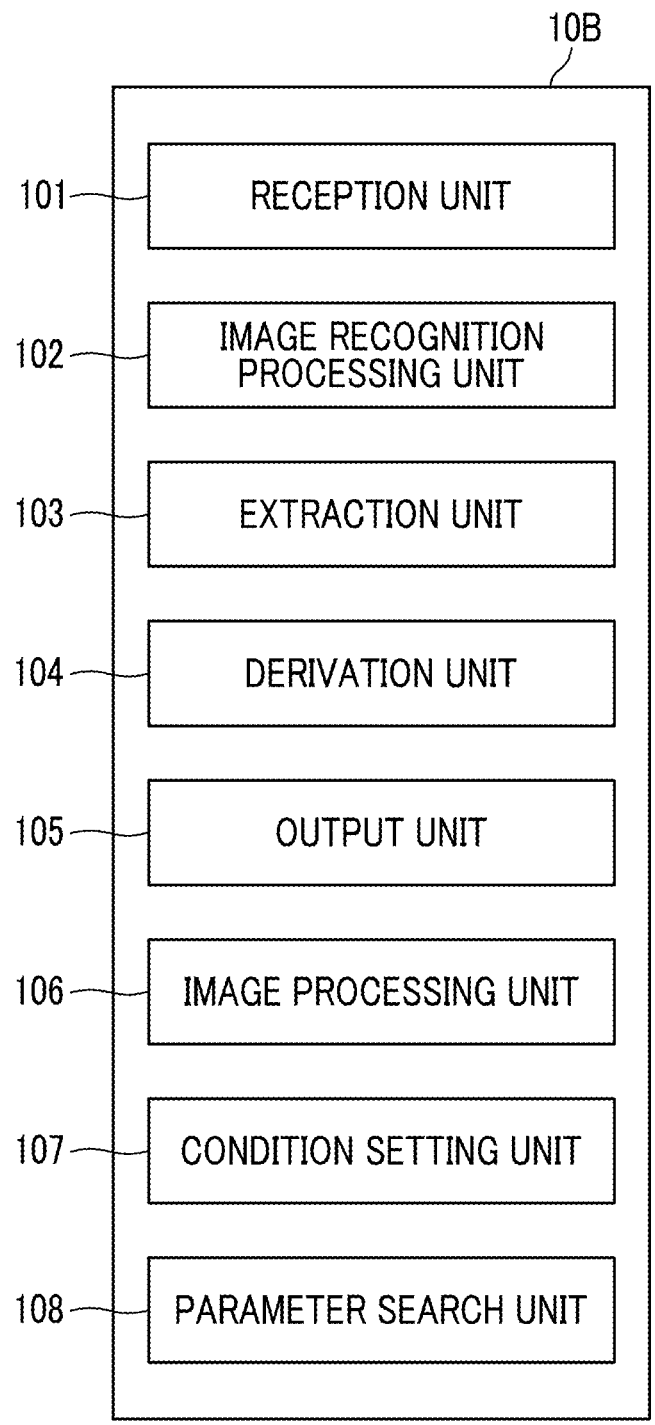
FIG. 17 is a block diagram showing the functional configuration of an image processing device according to a second embodiment.

Next, a second embodiment of the present disclosure will be described. An image processing system according to the second embodiment is different from the first embodiment in terms of a part of the functional configuration of the image processing device. The hardware configuration of the image processing device and the terminal are the same as in the first embodiment, and description of the contents overlapping the first embodiment will not be repeated. FIG. 17 is a block diagram showing the functional configuration of the image processing device according to the second embodiment.

An image processing device 10B of the embodiment can automatically acquire a development processing parameter taking into consideration a development processing parameter previously used by other users. As shown in FIG. 17, the image processing device 10B has, as the functional configuration, the reception unit 101, the image recognition processing unit 102, the extraction unit 103, the derivation unit 104, the output unit 105, the image processing unit 106, the condition setting unit 107, and a parameter search unit 108. The functional configurations are realized by the CPU 11 reading and executing the image processing program stored in the ROM 12 or the storage 14.

The reception unit 101, the image recognition processing unit 102, the extraction unit 103, the derivation unit 104, the output unit 105, the image processing unit 106, and the condition setting unit 107 are the same as those in the first embodiment.

The parameter search unit 108 receives a numerical value representing the use frequency as a search condition for the extracted applied parameters and searches for applied parameters matching the search condition based on the frequency distribution.

[Flow of Processing]

Figure 18:
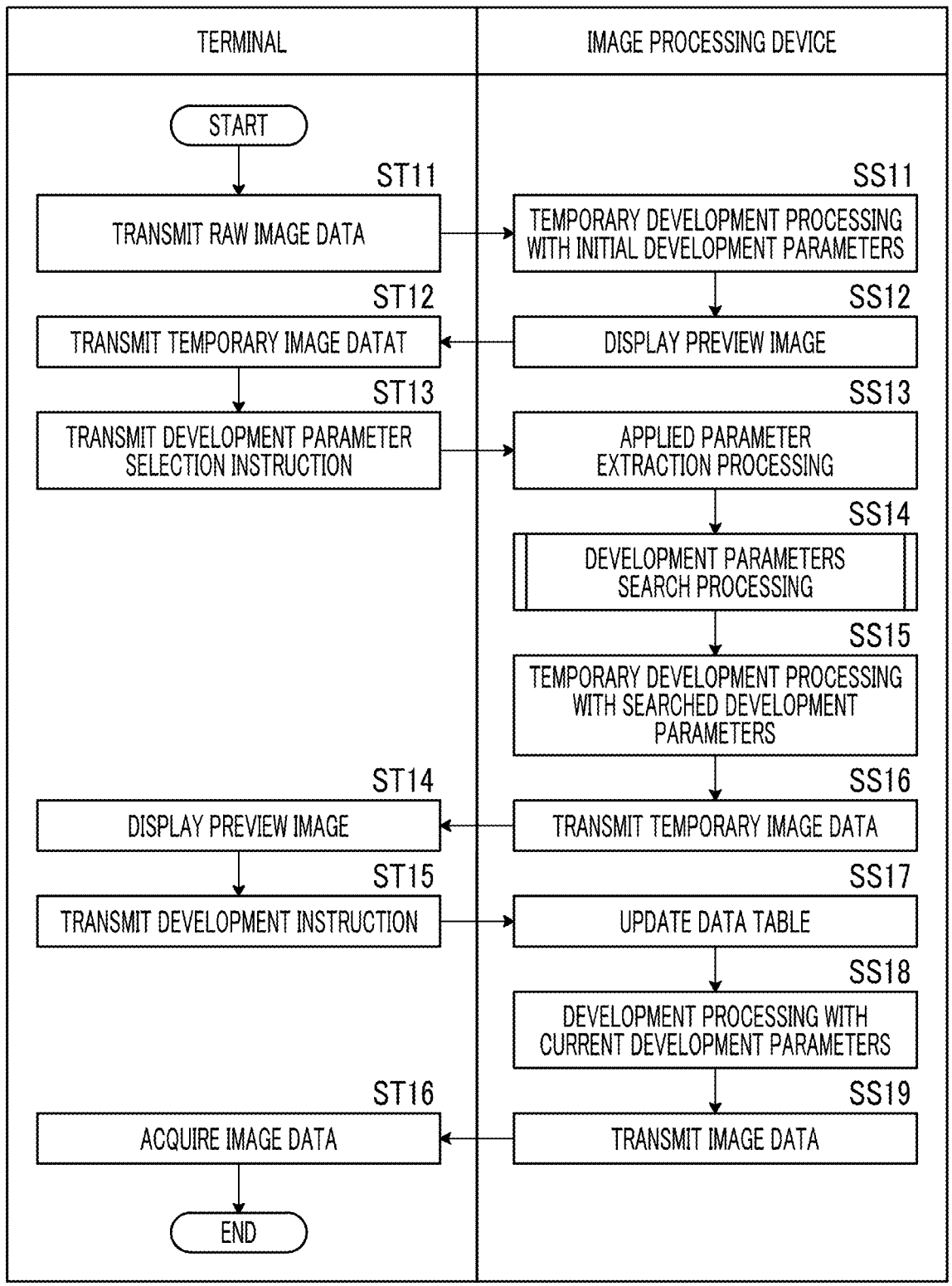
FIG. 18 is a flowchart illustrating a flow of processing at the time of image processing in the image processing system.

Next, processing that is executed in the embodiment will be described. FIG. 18 is a flowchart illustrating a flow of processing at the time of image processing in the image processing system.

In the flowchart shown in FIG. 18, processing (Steps ST11, SS11, SS12, and ST12) of transmitting the RAW image data for development from the terminal 20 to the image processing device 10B and displaying the preview image in the image display region 31 of the image processing application in the terminal 20 is the same as in the first embodiment, and thus description thereof will not be repeated.

Next, in a case where an automatic selection instruction of a development processing parameter to the RAW image data for development is input from the user through the image processing application, the CPU 21 transmits the automatic selection instruction to the image processing device 10B (Step ST13). The automatic selection instruction includes information regarding the items of the image processing and the frequency.

Figure 19:
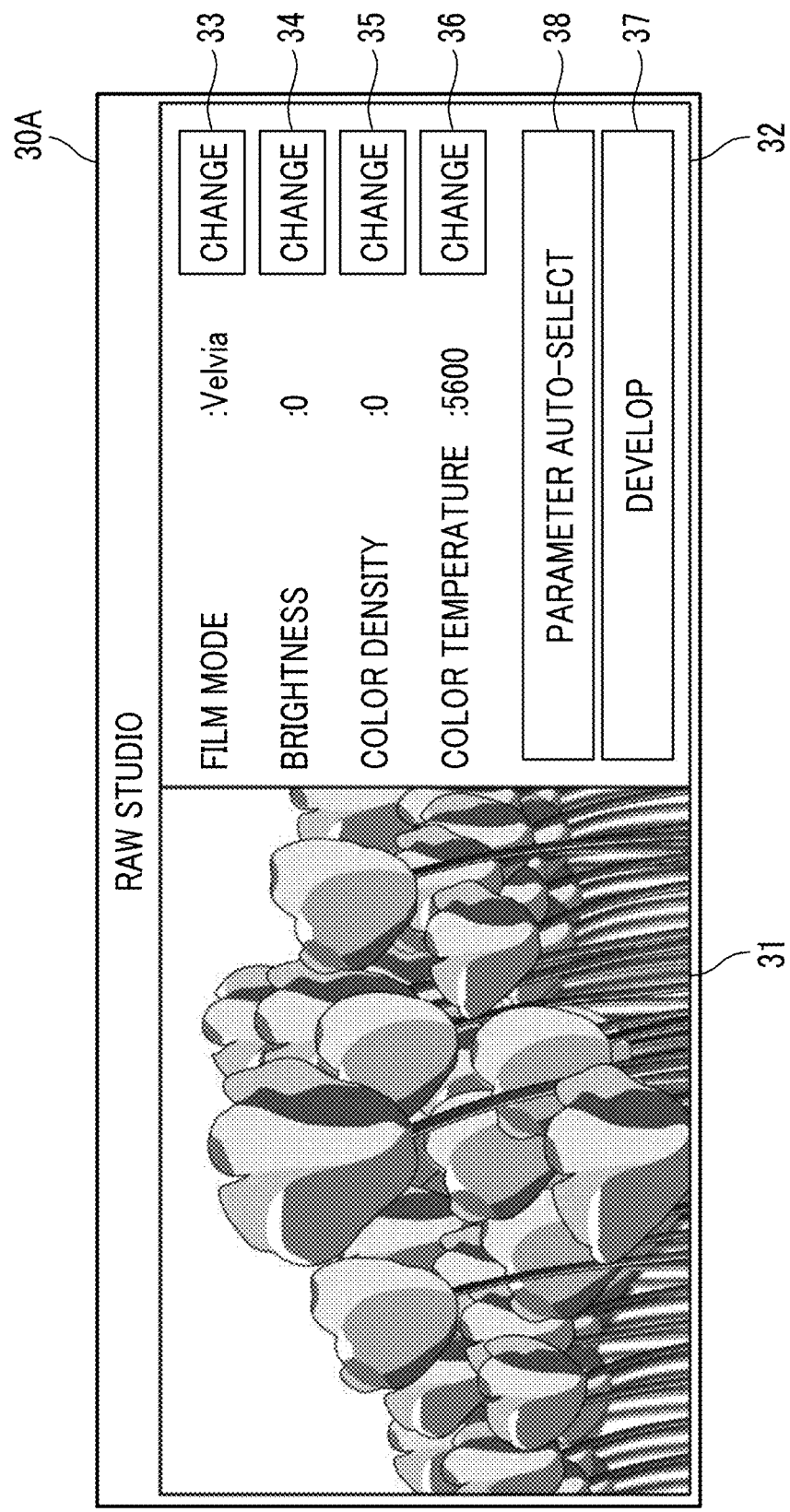
FIG. 19 is a diagram showing a screen display example of the image processing application.

FIG. 19 is a diagram showing a screen display example of the image processing application in the embodiment. An application screen 30A shown in FIG. 19 further has a Parameter Auto-Select button 38 compared to the application screen 30 of the first embodiment. In FIG. 19, "Velvia" in the drawing is a registered trademark.

In detail, in a case where the Parameter Auto-Select button 38 in the application screen 30A shown in FIG. 19 is clicked, the CPU 21 displays an automatic selection condition input window 50 in the image processing application.

Figure 20:
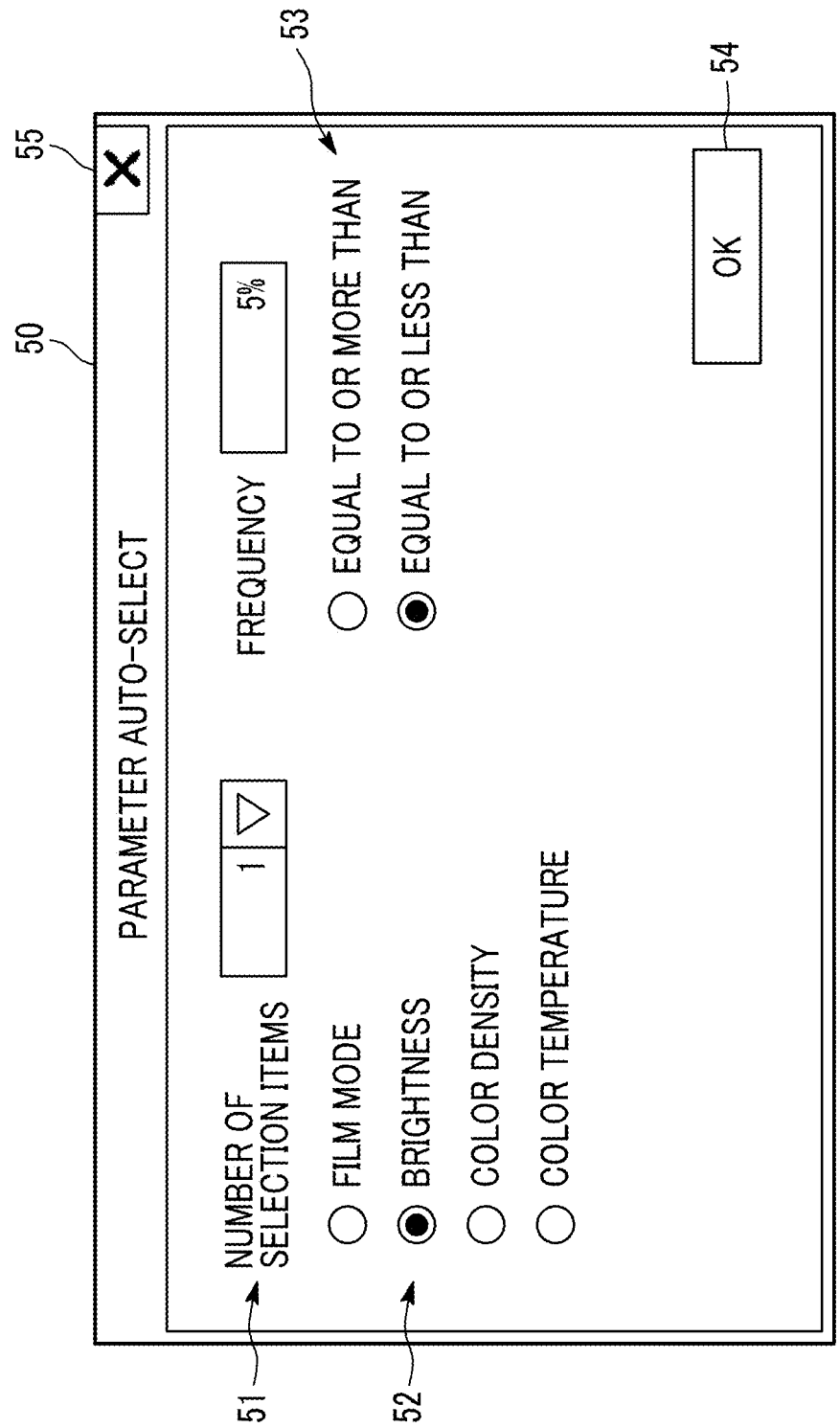
FIG. 20 is a diagram showing a display example of an automatic selection condition input window.

FIG. 20 is a diagram showing a display example of the automatic selection condition input window 50. As shown in FIG. 20, in the automatic selection condition input window 50, a number-of-items input portion 51 for inputting the number of items of the image processing for automatic selection, a selection region 52 for selecting the items of the image processing for automatic selection, a frequency input region 53 for inputting the frequency, an OK button 54 for deciding automatic selection, and a cancel button 55 for closing the automatic selection condition input window 50 without performing automatic selection are displayed.

The number-of-items input portion 51 comprises an input portion that receives a selection input of the number of items of 1 to 4 corresponding to the number of items (in this example, four items of Film Mode, Brightness, Color Density, and Color Temperature) of the image processing.

The selection region 52 comprises four check circles of Film Mode, Brightness, Color Density, and Color Temperature. The four check circles of the selection region 52 can be selected by the number of items input in the number-of-items input portion 51 to the maximum. In a case where a smaller number of items than the number of items input in the number-of-items input portion 51 are selected in the selection region 52, processing of selecting the number of insufficient items randomly is executed in the CPU 21.

The frequency input region 53 comprises an input portion for inputting the numerical value of the frequency and two check circles for selecting whether to be equal to or more than or equal to or less than the numerical value of the frequency.

In a case where the input of each item in the automatic selection condition input window 50 is performed and the OK button 54 is clicked by the user, the CPU 21 transmits an automatic selection instruction including the input search condition to the image processing device 10B. In the embodiment, a case where a condition that the number of items of the image processing for automatic selection is "1", the item of the image processing for automatic selection is "Brightness", and the frequency is "5% or less" is input will be described.

In a case where the automatic selection instruction is acquired from the terminal 20 in the image processing device 10B, the CPU 11 extracts applied parameter applied to RAW image data having a subject similar to RAW image data for development from the data table stored in the storage 14 (Step SS13).

Next, the CPU 11 searches for applied parameters matching the search condition from among the extracted applied parameter (Step SS14).

Figure 21:
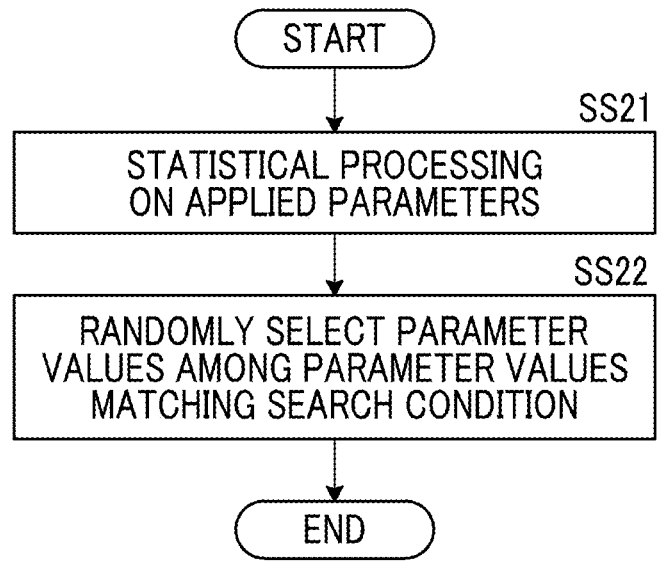
FIG. 21 is a flowchart illustrating a flow of processing at the time of automatic parameter search in the image processing device.

Here, search processing in Step SS14 will be described in detail. FIG. 21 is a flowchart illustrating a flow of processing at the time of automatic parameter search in the image processing device 10B.

First, next, the CPU 11 executes statistical processing of deriving a frequency distribution of a use frequency of each of parameter values of the extracted applied parameters (Step SS21). In the embodiment, since the condition that the item of the image processing for automatic selection is "Brightness" and the frequency is "5% or less" is input as the search condition, as shown in a graph of FIG. 22, statistical processing of parameter values of brightness is executed.

Figure 22:
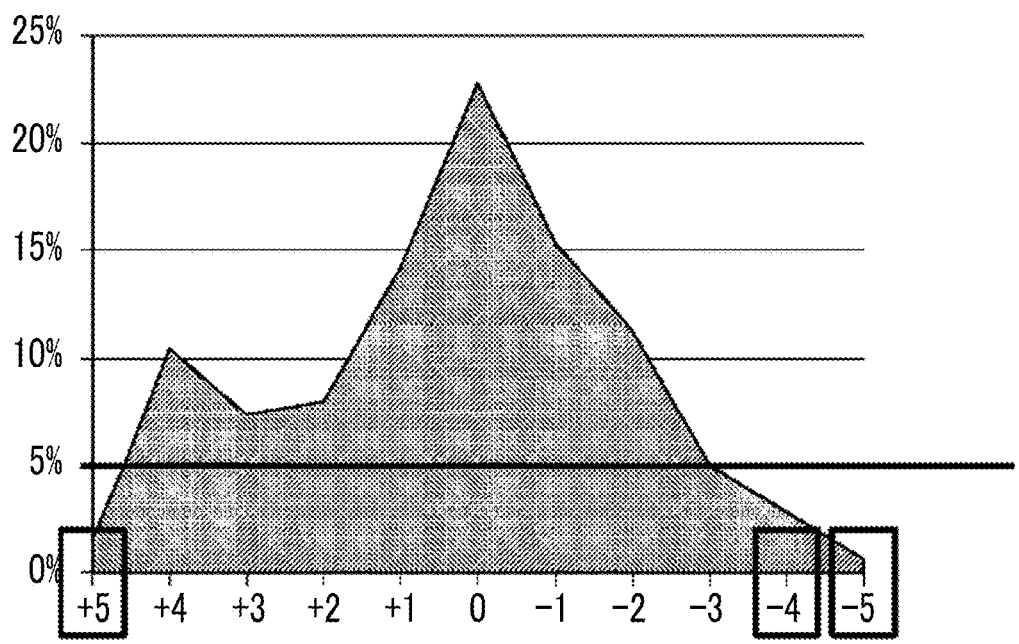
FIG. 22 is a graph showing a statistical processing result.

Next, the CPU 11 extracts parameter values having the frequency of 5% or less from among the parameter values of brightness (Step SS22). Here, in a case where the number of extracted parameter values is one, the CPU 11 acquires the parameter value as a search result. In a case where there are a plurality of extracted parameter values, the CPU 11 randomly selects one of a plurality of parameter values and acquires the selected parameter value as a search result. In an example shown in the graph of FIG. 22, the parameter values having the frequency of 5% or less among the parameter values of brightness are shown with a frame. In the graph of FIG. 22, since the number of parameter values having the frequency of 5% or less is three of "+5, −4, and 5", one is randomly selected from among the parameter values.

In a case where the automatic parameter search processing ends, the CPU 11 updates the automatically searched parameter value from the initial development processing parameters and executes temporary development processing of acquiring temporary image data for preview having a degraded resolution compared to a real image using the updated development processing parameter (Step SS15).

Next, the CPU 11 transmits the temporary image data obtained as a result of the temporary development processing and the automatically selected parameter value to the terminal 20 (Step SS16).

In the terminal 20, in a case where the temporary image data is acquired from the image processing device 10B, the CPU 21 displays a preview image based on the acquired temporary image data in the image display region 31 of the image processing application (Step ST15).

In a case where the user clicks the Parameter Auto-Select button 38 to perform additional automatic parameter selection, the processing of Steps ST13 to ST14 is executed. Finally, in a case where the Develop button 37 is clicked in a stage where the development processing parameters satisfactory to the user can be set, the CPU 21 transmits a development instruction to the image processing device 10B (Step ST15).

Subsequently, in a case where the development instruction from the terminal 20 is received in the image processing device 10B, processing (Steps SS17, SS18, SS19, and ST16) of acquiring image data in the terminal 20 and ending the process is the same as in the first embodiment, and thus, description thereof will not be repeated.

Operations and Effects

The image processing device 10B of the embodiment comprises the parameter search unit 108 that receives the numerical value representing the use frequency as the search condition to the extracted applied parameters and searches for the applied parameters matching the search condition based on the frequency distribution of the parameter value. With such an aspect, it is possible to allow the user to automatically acquire a development processing parameter taking into consideration the development processing parameter previously used by other users.

Modification Example in Second Embodiment

In the above-described embodiment, although automatic selection is performed on one item with the use frequency of one item of the development processing parameter as the search condition, automatic selection may be performed on a plurality of items with a use frequency of each combination of a plurality of items of the development processing parameters as a search condition.

Processing in a case where automatic selection is performed on a plurality of items of the development processing parameters is as in the flowchart shown in FIG. 18; however, the contents of the search processing of the applied parameter in Step SS14 is different from the above description.

Figure 23:
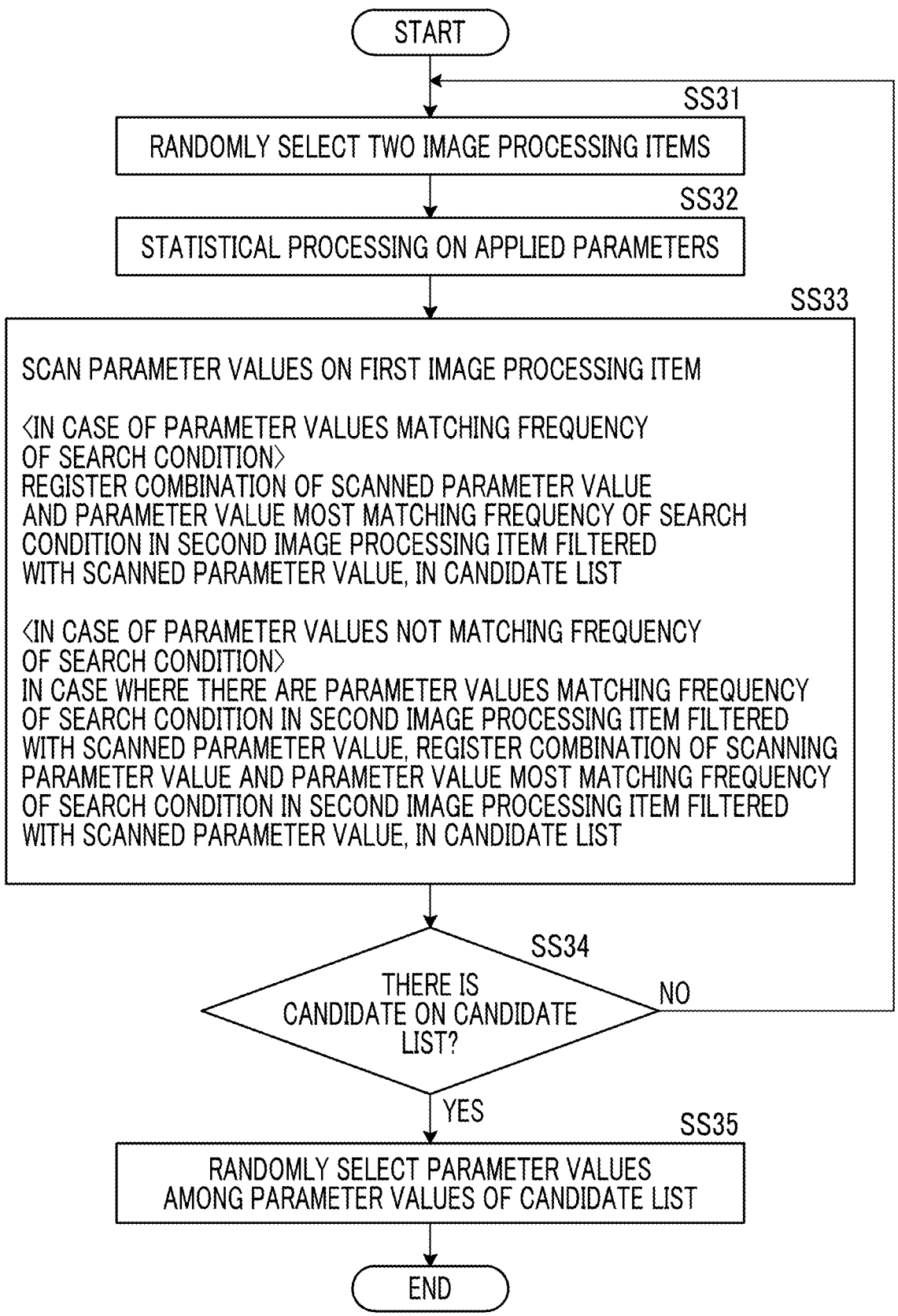
FIG. 23 is a flowchart illustrating a flow of processing at the time of automatic parameter search in the image processing device.

An example of the search processing of the applied parameters in Step SS14 in a case where automatic selection is performed on a plurality of items of the development processing parameters will be described. FIG. 23 is a flowchart illustrating a flow of processing at the time of automatic search in a case where automatic selection is performed on a plurality of items of the development processing parameters.

Here, in the automatic selection condition input window 50 shown in FIG. 20, a case where a condition that the number of items of the image processing for automatic selection is "2", the item of the image processing for automatic selection is "Random", and the frequency is "5% or less" is input as the search condition will be described.

First, the CPU 11 randomly selects two image processing items (Step SS31).

Next, the CPU 11 executes statistical processing of calculating a frequency distribution of a use frequency of each of parameter values of extracted applied parameters (Step SS32). Here, description will be provided assuming that, in Step SS31, the item "Film Mode" is selected as a first image processing item, and the item "Brightness" is selected as a second image processing item.

Figure 24:
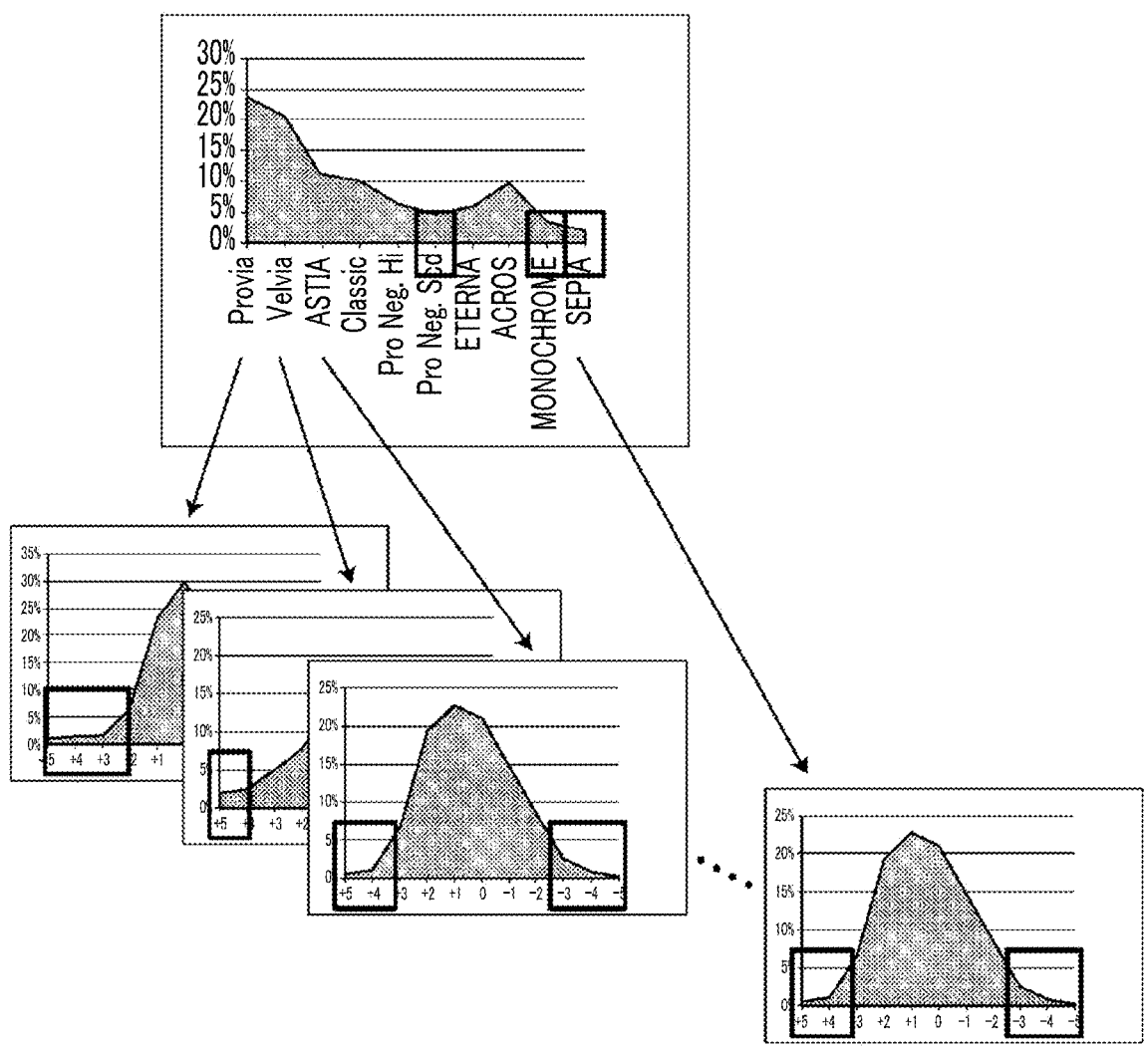
FIG. 24 is a graph showing a statistical processing result.

FIG. 24 is a graph showing a statistical processing result. In FIG. 24, all "Provia", "Velvia", "Astia", "Eterna", and "Acros" in the drawing are registered trademarks. As shown in the graph of FIG. 24, in this case, the CPU 11 first calculates a frequency distribution of a use frequency of each of the parameter values of the film mode as the first image processing item.

Next, the CPU 11 scans the parameter values on the film mode as the first image processing item to perform an arithmetic operation on a combination with each parameter value of brightness as the second image processing item (Step SS33). Scanning the parameter values of the first image processing item means that an arithmetic operation is performed on all parameter values of the first image processing item in order one by one. For example, in an example shown in FIG. 24, the parameter values are set in an order of "Provia (Registered Trademark)", "Velvia (Registered Trademark)", "Astia (Registered Trademark)" . . . etc, from the left side of a graph on an upper side, and an arithmetic operation is performed on a combination with each parameter value of brightness as the second image processing item for each parameter value.

Specifically, in a case where a scanned parameter value is a parameter value matching the frequency of the search condition, a combination of the scanned parameter value and a parameter value most matching the frequency of the search condition in the second image processing item filtered with the scanned parameter value is registered on a candidate list.

The parameter value most matching the frequency of the search condition means a parameter value having the lowest frequency in a case where the frequency is set to be equal to or less than the input numerical value, and means a parameter value having the highest frequency in a case where the frequency is set to be equal to or more than the input numerical value.

Here, filtering with the scanned parameter value means processing of extracting the applied parameters applied to RAW image data to which the first image processing item is set, in the RAW image data having the subject similar to the RAW image data for development as described in the modification example in the first embodiment.

In a case where the scanned parameter value is a parameter value not matching the frequency of the search condition, and in a case where there are parameter values matching the frequency of the search condition in the second image processing item filtered with the scanned parameter value, a combination of the scanned parameter value and a parameter value most matching the frequency of the search condition in the second image processing item filtered with the scanned parameter value is registered on the candidate list.

Here, since the frequency of the search condition is set to be 5% or less, in a case where the scanned parameter value of the film mode is 5% or less, a combination of the scanned parameter value and a parameter value having the lowest frequency among the parameter values of brightness filtered with the scanned parameter value is registered on the candidate list. In a case where the scanned parameter value of the film mode is not 5% or less, and in a case where there are parameter values of 5% or less among the parameter values of brightness filtered with the scanned parameter value, a combination of the scanned parameter value and a parameter value having the lowest frequency among the parameter values of brightness filtered with the scanned parameter value is registered on the candidate list.

Next, the CPU 11 determines whether or not there is a candidate on the candidate list (Step SS34). In Step SS34, in a case where determination is made that there is a candidate on the candidate list (a determination result is Yes), the CPU 11 randomly select one combination of parameter values from among combinations of parameter values of the candidate list, sets the combination as the parameter values of the film mode and brightness, and progresses to Step SS15 of the flowchart shown in FIG. 18.

In Step SS34, in a case where determination is made that there is no candidate on the candidate list (a determination result is No), the CPU 11 progresses to Step SS31 and repeats the processing from the selection of the two image processing items.

In this way, with the aspect where automatic selection of the development processing parameters is performed on a plurality of image processing items, it is possible to allow the user to automatically acquire a more desirable development processing parameter on the development processing parameter taking into consideration the development processing parameter previously used by other users.

Modification Examples

Although the present disclosure has been described based on the preferred embodiments, embodiments to which the present disclosure can be applied are not limited to the above-described embodiments.

For example, image data that is handled by the image processing device of the present disclosure is not limited to RAW image data, and for example, any image data, such as high-resolution rendering image data, may be employed. The image processing is not limited to the development processing, and any kind of image processing may be employed.

An aspect regarding a storage destination of the data table is not limited to an aspect where the data table is stored in the storage in the image processing device, and an aspect where the data table is stored in a server provided separately from the image processing device may be employed.

In the respective embodiments described above, the processing that is executed by the CPU 11 or 21 reading and executing software (an example of a program) may be executed by various processors other than a CPU. Examples of the processors in this case include a programmable logic device (PLD) that can change a circuit configuration after manufacturing, such as a field-programmable gate array (FPGA), and a dedicated electric circuit that is a processor having a circuit configuration dedicatedly designed for executing specific processing, such as an application specific integrated circuit (ASIC). The respective processing may be executed by one of various processors or may be executed by a combination of two or more processors (for example, a plurality of FPGAs or a combination of a CPU and an FPGA) of the same type or different types. The hardware structure of various processors is more specifically an electric circuit (circuitry), in which circuit elements, such as semiconductor elements, are combined.

In the respective embodiments described above, although an aspect where the image processing program is stored (for example, installed) in the ROM 12 or the storage 14 in advance has been described, the present disclosure is not limited thereto. The program may be provided in a form recorded in a recording medium, such as a compact disk read only memory (CD-ROM), a digital versatile disk read only memory (DVD-ROM), or a universal serial bus (USB) memory. Alternatively, the program may be in a form of being downloaded from an external device through a network.

A ROM is a broad concept including a flash memory, an erasable programmable read only memory (EPROM), an electrically erasable programmable read only memory (EEPROM), or the like that is a rewritable ROM.

The present disclosure is not limited to an aspect where the request for image processing in the terminal is performed using the image processing application, and may employ an aspect where the request for image processing in the terminal may be performed using an Internet browser.

A part of the functions of the image processing device in the respective embodiments described above may be provided in the terminal. For example, the function of the derivation unit may be provided on the terminal side, the applied parameters extracted in the extraction unit on the image processing device side may be transmitted to the terminal, and the use frequency of the designated parameter among the applied parameters extracted by the extraction unit may be derived in the derivation unit on the terminal side.

In addition to the above, it is needless to say that alternations may be made without departing from the spirit and scope of the present disclosure. The technique of the present disclosure also extends to a recording medium that non-transitorily stores the program, in addition to the program.

All cited documents, patent applications, and technical standards described in the specification are incorporated by reference in the specification to the same extent as in a case where each individual cited document, patent application, or technical standard is specifically and individually indicated to be incorporated by reference.

In the image processing device of the above-described aspect, the processor may be configured to derive a frequency distribution of a use frequency of each of the parameter values of the extracted applied parameters, and the processor may be configured to output the frequency distribution.

In the image processing device of the above-described aspect, the processor may be further configured to set a second extraction condition different from a degree of similarity of a subject in addition to a first extraction condition regarding the degree of similarity of the subject as an extraction condition of the applied parameters by the processor, the processor may be configured to extract the applied parameters based on the first extraction condition and the second extraction condition, and the processor may be configured to derive the use frequency of the designated parameter among the applied parameters based on the parameter values of the applied parameters extracted under the first extraction condition and the second extraction condition.

In the image processing device of the above-described aspect, an attribute of the user who designates the applied parameters at the time of the image processing may be associated with the applied parameters in the storage unit, the second extraction condition may be the attribute of the user, and the processor may be configured to derive the use frequency of the designated parameter among the applied parameters based on the parameter values of the applied parameters designated by the user having a similar subject and matching the second extraction condition.

In the image processing device of the above-described aspect, the processor may be configured to derive a frequency distribution of a use frequency of each of the parameter values of the extracted applied parameters, the processor may be further configured to receive a numerical value representing the use frequency as a search condition to the extracted applied parameters and searches for the applied parameters matching the search condition based on the frequency distribution, and the processor may be configured to output the searched applied parameters.

In the image processing device of the above-described aspect, the processor may be configured to derive a use frequency for each combination of a plurality of items included in the extracted applied parameters, and the processor may be configured to search for the applied parameters having the use frequency of each combination matching the search condition based on the frequency distribution by receiving the numerical value representing the use frequency as the search condition.

In the image processing device of the above-described aspect, the subjects of the processed image data stored in association with the applied parameters may be stored with either of the processed image data or tag information representing the subjects obtained by executing image recognition processing on the processed image data in the storage unit.

In the image processing device of the above-described aspect, the processor may be further configured to execute the image recognition processing to recognize a subject from at least the target data between the target data and the processed image data.

In the image processing device of the above-described aspect, the processor may be further configured to execute the image processing based on the designated parameter.

In the image processing device of the above-described aspect, the processor may be configured to acquire the target data and the designated parameter through a terminal different from the image processing device to receive the request for image processing from the user, and the processor may be configured to output output data to the terminal.

In the image processing device of the above-described aspect, the image data may be RAW image data, and the image processing parameters may include development processing parameters to the RAW image data.

In the image processing device of the above-described aspect, the processor may be configured to derive a use frequency for each combination of a plurality of items included in the extracted applied parameters, and the processor may be configured to, with the numerical value representing the use frequency as the search condition to the extracted applied parameters, search for the applied parameters having the use frequency of each combination matching the search condition based on the frequency distribution.

What is claimed is:

1. An image processing device comprising:
   at least one processor configured to
   acquire target data as image data to be a target of image processing and a designated parameter as an image processing parameter designated by a user to receive a request for image processing from the user,
   extract, from a storage unit in which subjects of processed image data previously subjected to the image processing and applied parameters as image processing parameters applied to the processed image data are accumulated in association with each other, the applied parameters applied to the processed image data having a subject similar to the target data, derive a use frequency of the designated parameter among the extracted applied parameters based on parameter values of the extracted applied parameters, and output the use frequency of the designated parameter.

2. The image processing device according to claim 1, wherein the processor is configured to derive a frequency distribution of a use frequency of each of the parameter values of the extracted applied parameters, and the processor is configured to output the frequency distribution.

3. The image processing device according to claim 1, wherein the processor is further configured to set a second extraction condition different from a degree of similarity of a subject in addition to a first extraction condition regarding the degree of similarity of the subject as an extraction condition of the applied parameters by the processor, the processor is configured to extract the applied parameters based on the first extraction condition and the second extraction condition, and the processor is configured to derive the use frequency of the designated parameter among the applied parameters based on the parameter values of the applied parameters extracted under the first extraction condition and the second extraction condition.

4. The image processing device according to claim 3, wherein an attribute of the user who designates the applied parameters at the time of the image processing is associated with the applied parameters in the storage unit, the second extraction condition is the attribute of the user, and the processor is configured to derive the use frequency of the designated parameter among the applied parameters based on the parameter values of the applied parameters designated by the user having a similar subject and matching the second extraction condition.

5. The image processing device according to claim 1, wherein the processor is configured to derive a frequency distribution of a use frequency of each of the parameter values of the extracted applied parameters, the processor is further configured to receive a numerical value representing the use frequency as a search condition to the extracted applied parameters and searches for the applied parameters matching the search condition based on the frequency distribution, and the processor is configured to output the searched applied parameters.

6. The image processing device according to claim 5, wherein the processor is configured to derive a use frequency for each combination of a plurality of items included in the extracted applied parameters, and the processor is configured to search for the applied parameters having the use frequency of each combination matching the search condition based on the frequency distribution by receiving the numerical value representing the use frequency as the search condition.

7. The image processing device according to claim 1, wherein the subjects of the processed image data stored in association with the applied parameters are stored with either of the processed image data or tag information representing the subjects obtained by executing image recognition processing on the processed image data in the storage unit.

8. The image processing device according to claim 7, wherein the processor is further configured to execute the image recognition processing to recognize a subject from at least the target data between the target data and the processed image data.

9. The image processing device according to claim 1, wherein the processor is further configured to execute the image processing based on the designated parameter.

10. The image processing device according to claim 1, wherein the processor is configured to acquire the target data and the designated parameter through a terminal different from the image processing device to receive the request for image processing from the user, and the processor is configured to output output data to the terminal.

11. The image processing device according to claim 1, wherein the image data is RAW image data, and the image processing parameters include development processing parameters to the RAW image data.

12. An image processing device comprising:

at least one processor configured to acquire target data as image data to be a target of image processing and a numerical value representing a use frequency designated by a user to receive a request for image processing from the user, extract, from a storage unit in which subjects of processed image data previously subjected to the image processing and applied parameters as image processing parameters applied to the processed image data are accumulated in association with each other, the applied parameters applied to the processed image data having a subject similar to the target data, derive a frequency distribution of a use frequency of each of parameter values of the extracted applied parameters, and with the numerical value representing the use frequency as a search condition to the extracted applied parameters, search for the applied parameters matching the search condition based on the frequency distribution.

13. The image processing device according to claim 12, wherein the processor is configured to derive a use frequency for each combination of a plurality of items included in the extracted applied parameters, and the processor is configured to, with the numerical value representing the use frequency as the search condition to the extracted applied parameters, search for the applied parameters having the use frequency of each combination matching the search condition based on the frequency distribution.

14. An image processing system comprising:

a terminal; and an image processing device, wherein the image processing system includes at least one processor configured to acquire target data as image data to be a target of image processing and a designated parameter as an image processing parameter designated by a user to receive a request for image processing from the user, extract, from a storage unit in which subjects of processed image data previously subjected to the image processing and applied parameters as image processing parameters applied to the processed image data are accumulated in association with each other, the applied parameters applied to the processed image data having a subject similar to the target data, derive a use frequency of the designated parameter among the extracted applied parameters based on parameter values of the extracted applied parameters, and output the use frequency of the designated parameter to the terminal.

15. An image processing method comprising:

acquiring target data as image data to be a target of image processing and a designated parameter as an image processing parameter designated by a user to receive a request for image processing from the user;

extracting, from a storage unit in which subjects of processed image data previously subjected to the image processing and applied parameters as image processing parameters applied to the processed image data are accumulated in association with each other, the applied parameters applied to the processed image data having a subject similar to the target data;

deriving a use frequency of the designated parameter among the extracted applied parameters based on parameter values of the extracted applied parameters; and outputting the use frequency of the designated parameter.

16. A non-transitory computer-readable storage medium storing an image processing program causing a computer to:

acquire target data as image data to be a target of image processing and a designated parameter as an image processing parameter designated by a user to receive a request for image processing from the user;

extract, from a storage unit in which subjects of processed image data previously subjected to the image processing and applied parameters as image processing parameters applied to the processed image data are accumulated in association with each other, the applied parameters applied to the processed image data having a subject similar to the target data;

derive a use frequency of the designated parameter among the extracted applied parameters based on parameter values of the extracted applied parameters; and output the use frequency of the designated parameter.

* * * * *